US012360194B2

(12) United States Patent
Sadiq et al.

(10) Patent No.: US 12,360,194 B2
(45) Date of Patent: Jul. 15, 2025

(54) DETERMINING TRANSMISSION TIMING OF A POSITIONING BEACON FROM A TIME OF RECEPTION OF A REFERENCE SIGNAL

(71) Applicant: QUALCOMM Incorporated, San Diego, CA (US)

(72) Inventors: Bilal Sadiq, Basking Ridge, NJ (US); Tianyang Bai, Bridgewater, NJ (US); Vasanthan Raghavan, West Windsor Township, NJ (US); Muhammad Nazmul Islam, Littleton, MA (US)

(73) Assignee: QUALCOMM Incorporated, San Diego, CA (US)

( * ) Notice: Subject to any disclaimer, the term of this patent is extended or adjusted under 35 U.S.C. 154(b) by 1696 days.

(21) Appl. No.: 16/394,728

(22) Filed: Apr. 25, 2019

(65) Prior Publication Data

US 2019/0361111 A1 Nov. 28, 2019

Related U.S. Application Data

(60) Provisional application No. 62/676,900, filed on May 25, 2018.

(51) Int. Cl.
*G01S 5/02* (2010.01)
*G01S 13/76* (2006.01)
(Continued)

(52) U.S. Cl.
CPC .......... *G01S 5/0215* (2013.01); *G01S 13/765* (2013.01); *G01S 13/878* (2013.01); *H04W 64/00* (2013.01)

(58) Field of Classification Search
CPC .... G01S 13/878; G01S 13/765; G01S 5/0215; H04W 64/00; H04W 4/025; H04W 16/28;
(Continued)

(56) References Cited

U.S. PATENT DOCUMENTS

2015/0282112 A1* 10/2015 Bialer ..................... H04L 45/24
455/456.1
2016/0202344 A1 7/2016 Sanderovich et al.
2016/0360370 A1* 12/2016 Edge ..................... H04W 4/025

FOREIGN PATENT DOCUMENTS

CN 104853402 A 8/2015
CN 105850055 A 8/2016
(Continued)

OTHER PUBLICATIONS

International Search Report and Written Opinion—PCT/US2019/029314—ISA/EPO—Jun. 27, 2019.

*Primary Examiner* — William Kelleher
*Assistant Examiner* — Juliana Cross
(74) *Attorney, Agent, or Firm* — Thien T. Nguyen

(57) ABSTRACT

In an embodiment, a first node receives, from a second node, a plurality of beams. The first node determines a time of arrival of each beam of the plurality of beams. The first node identifies, from the plurality of beams, one or more first beams of interest for a positioning procedure based on the times of arrival of the plurality of beams. The first node determines a first reference timing based on the time of arrival for a given beam among the identified one or more first beams of interest. The first node sends, to the second node, a positioning beacon in accordance with the first reference timing.

30 Claims, 12 Drawing Sheets

(51) Int. Cl.
*G01S 13/87* (2006.01)
*H04W 64/00* (2009.01)

(58) Field of Classification Search
CPC .. H04W 64/006; H04L 5/0053; H04L 5/0051; H04L 5/0094; H04B 7/0617; H04B 7/0695
See application file for complete search history.

(56) References Cited

FOREIGN PATENT DOCUMENTS

| | | | |
|---|---|---|---|
| EP | 3306337 A1 | 4/2018 | |
| WO | WO-2017164925 A1 | 9/2017 | |
| WO | 2018026317 A1 | 2/2018 | |
| WO | WO-2018080730 A1 * | 5/2018 | ........... H04B 7/0667 |

* cited by examiner

DETERMINING TRANSMISSION TIMING OF A POSITIONING BEACON FROM A TIME OF RECEPTION OF A REFERENCE SIGNAL

CROSS-REFERENCE TO RELATED APPLICATION

The present Application for Patent claims the benefit of U.S. Provisional Patent Application No. 62/676,900 entitled, "DETERMINING TRANSMISSION TIMING OF A POSITIONING BEACON FROM A TIME OF RECEPTION OF A REFERENCE SIGNAL", filed May 25, 2018, and assigned to the assignee hereof and hereby expressly incorporated herein by reference in its entirety.

TECHNICAL FIELD

Various aspects described herein generally relate to wireless communication systems, and more particularly, to determining transmission timing of a positioning beacon from a time of reception of reference signal.

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

Some wireless communication networks, such as 5G, support operation at very high and even extremely-high frequency (EHF) bands, such as millimeter wave (mmW) frequency bands (generally, wavelengths of 1 mm to 10 mm, or 30 to 300 GHz). These extremely high frequencies may support very high throughput such as up to six gigabits per second (Gbps). One of the challenges for wireless communication at very high or extremely high frequencies, however, is that a significant propagation loss may occur due to the high frequency. As the frequency increases, the wavelength may decrease, and the propagation loss may increase as well. At mmW frequency bands, the propagation loss may be severe. For example, the propagation loss may be on the order of 22 to 27 dB, relative to that observed in either the 2.4 GHz, or 5 GHz bands.

Propagation loss is also an issue in Multiple Input-Multiple Output (MIMO) and massive MIMO systems in any band. The term MIMO as used herein will generally refer to both MIMO and massive MIMO. MIMO is a method for multiplying the capacity of a radio link by using multiple transmit and receive antennas to exploit multipath propagation. Multipath propagation occurs because radio frequency (RF) signals not only travel by the shortest path between the transmitter and receiver, which may be a line of sight (LOS) path, but also over a number of other paths as they spread out from the transmitter and reflect off other objects such as hills, buildings, water, and the like on their way to the receiver. A transmitter in a MIMO system includes multiple antennas and takes advantage of multipath propagation by directing these antennas to each transmit the same RF signals on the same radio channel to a receiver. The receiver is also equipped with multiple antennas tuned to the radio channel that can detect the RF signals sent by the transmitter. As the RF signals arrive at the receiver (some RF signals may be delayed due to the multipath propagation), the receiver can combine them into a single RF signal. Because the transmitter sends each RF signal at a lower power level than it would send a single RF signal, propagation loss is also an issue in a MIMO system.

To address propagation loss issues in mmW band systems and MIMO systems, transmitters may use beamforming to extend RF signal coverage. In particular, transmit beamforming is a technique for emitting an RF signal in a specific direction, whereas receive beamforming is a technique used to increase receive sensitivity of RF signals that arrive at a receiver along a specific direction. Transmit beamforming and receive beamforming may be used in conjunction with each other or separately, and references to "beamforming" may hereinafter refer to transmit beamforming, receive beamforming, or both. Traditionally, when a transmitter broadcasts an RF signal, it broadcasts the RF signal in nearly all directions determined by the fixed antenna pattern or radiation pattern of the antenna. With beamforming, the transmitter determines where a given receiver is located relative to the transmitter and projects a stronger downlink RF signal in that specific direction, thereby providing a faster (in terms of data rate) and stronger RF signal for the receiver. To change the directionality of the RF signal when transmitting, a transmitter can control the phase and relative amplitude of the RF signal broadcasted by each antenna. For example, a transmitter may use an array of antennas (also referred to as a "phased array" or an "antenna array") that creates a beam of RF waves that can be "steered" to point in different directions, without actually moving the antennas. Specifically, the RF current is fed to the individual antennas with the correct phase relationship so that the radio waves from the separate antennas add together to increase the radiation in a desired direction, while cancelling the radio waves from the separate antennas to suppress radiation in undesired directions.

To support position estimations in terrestrial wireless networks, a mobile device can be configured to measure and report the observed time difference of arrival (OTDOA) or reference signal timing difference (RSTD) between reference RF signals received from two or more network nodes (e.g., different base stations or different transmission points (e.g., antennas) belonging to the same base station).

Where a transmitter uses beamforming to transmit RF signals, the beams of interest for data communication between the transmitter and receiver will be the beams carrying RF signals having the highest received signal strength (or highest received Signal to Noise plus Interference Ratio (SINR), for example, in the presence of a directional interfering signal). However, the receiver's ability to perform certain tasks may suffer when the receiver relies upon the beam with the highest received signal strength. For example, in a scenario where the beam with the highest received signal strength travels over a non-LOS (NLOS) path that is longer than the shortest path (i.e., a LOS path or a shortest NLOS path), the RF signals may arrive later than RF signal(s) received over the shortest path due to propagation delay. Accordingly, if the receiver is performing a task that requires precise timing measurements and the beam with the highest received signal strength is affected by longer propagation delay, then the beam with the highest received signal strength may not be optimal for the task at hand.

SUMMARY

An embodiment of the disclosure is directed to a method of operating a first node, including receiving, at the first node from a second node, a plurality of beams, determining, by the first node, a time of arrival of each beam of the plurality of beams, identifying, by the first node from the plurality of beams, one or more first beams of interest for a positioning procedure based on the times of arrival of the plurality of beams, determining a first reference timing based on the time of arrival for a given beam among the identified one or more first beams of interest, and sending, by the first node to the second node, a positioning beacon in accordance with the first reference timing.

Another embodiment of the disclosure is directed to a first node, including means for receiving, from a second node, a plurality of beams, means for determining a time of arrival of each beam of the plurality of beams, means for identifying, from the plurality of beams, one or more first beams of interest for a positioning procedure based on the times of arrival of the plurality of beams, means for determining a first reference timing based on the time of arrival for a given beam among the identified one or more first beams of interest, and means for sending, to the second node, a positioning beacon in accordance with the first reference timing.

Another embodiment of the disclosure is directed to a first node, including a memory, and at least one processor coupled to the memory and a communications interface, the at least one processor configured to receive, from a second node, a plurality of beams, determine a time of arrival of each beam of the plurality of beams, identify, from the plurality of beams, one or more first beams of interest for a positioning procedure based on the times of arrival of the plurality of beams, determine a first reference timing based on the time of arrival for a given beam among the identified one or more first beams of interest, and send, to the second node, a positioning beacon in accordance with the first reference timing.

Another embodiment of the disclosure is directed to a non-transitory computer-readable medium containing instructions stored thereon, which, when executed by a first node, cause the first node to perform operations, the instructions including at least one instruction configured to cause the first node to receive, from a second node, a plurality of beams, at least one instruction configured to cause the first node to determine a time of arrival of each beam of the plurality of beams, at least one instruction configured to cause the first node to identify, from the plurality of beams, one or more first beams of interest for a positioning procedure based on the times of arrival of the plurality of beams, at least one instruction configured to cause the first node to determine a first reference timing based on the time of arrival for a given beam among the identified one or more first beams of interest, and at least one instruction configured to cause the first node to send, to the second node, a positioning beacon in accordance with the first reference timing.

BRIEF DESCRIPTION OF THE DRAWINGS

A more complete appreciation of the various aspects described herein and many attendant advantages thereof will be readily obtained as the same becomes better understood by reference to the following detailed description when considered in connection with the accompanying drawings which are presented solely for illustration and not limitation, and in which.

DETAILED DESCRIPTION

Figure 1:
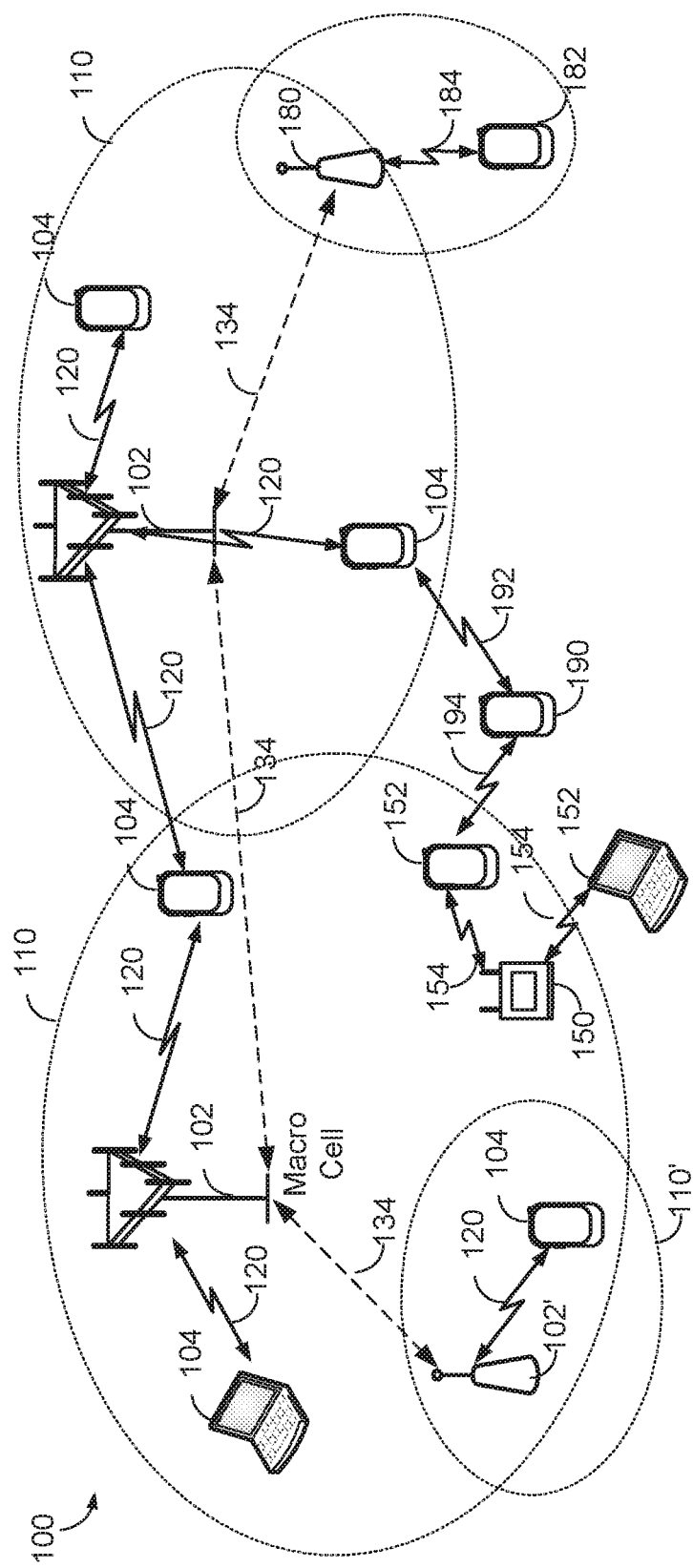
FIG. 1 illustrates an exemplary wireless communications system, according to various aspects.

Various aspects described herein generally relate to wireless communication systems, and more particularly, to determining transmission timing of a positioning beacon from a time of reception of reference signal. In an aspect, a first node (e.g., a user equipment, a base station, or antenna(s) associated with a base station) receives, from a second node, a plurality of beams. The first node determines a time of arrival of each beam of the plurality of beams. The first node identifies, from the plurality of beams, one or more beams of interest for a positioning procedure based on the times of arrival of the plurality of beams. The first node determines a reference timing based on the time of arrival for a given beam among the identified one or more first beams of interest. The first node sends, by the first node to the second node, a positioning beacon in accordance with the reference timing. Specifically, in one embodiment, the reference timing is the time of transmission of the positioning beacon, with the reference timing being offset from the time of arrival for the given beam by a given amount of time. The time of arrival of this positioning beacon at the second node is then used by second node to estimate Round-Trip Propagation Time (RTT). That RTT is subsequently used to estimate distance between the nodes and ultimately the position of the first node.

These and other aspects are disclosed in the following description and related drawings to show specific examples relating to exemplary aspects. Alternate aspects will be apparent to those skilled in the pertinent art upon reading this disclosure, and may be constructed and practiced without departing from the scope or spirit of the disclosure. Additionally, well-known elements will not be described in detail or may be omitted so as to not obscure the relevant details of the aspects disclosed herein.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage, or mode of operation.

The terminology used herein describes particular aspects only and should not be construed to limit any aspects disclosed herein. As used herein, the singular forms "a," "an," and "the" are intended to include the plural forms as well, unless the context clearly indicates otherwise. Those skilled in the art will further understand that the terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Further, various aspects may be described in terms of sequences of actions to be performed by, for example, elements of a computing device. Those skilled in the art will recognize that various actions described herein can be performed by specific circuits (e.g., an application specific integrated circuit (ASIC)), by program instructions being executed by one or more processors, or by a combination of both. Additionally, these sequences of actions described herein can be considered to be embodied entirely within any form of non-transitory computer-readable medium having stored thereon a corresponding set of computer instructions that upon execution would cause an associated processor to perform the functionality described herein. Thus, the various aspects described herein may be embodied in a number of different forms, all of which have been contemplated to be within the scope of the claimed subject matter. In addition, for each of the aspects described herein, the corresponding form of any such aspects may be described herein as, for example, "logic configured to" and/or other structural components configured to perform the described action.

As used herein, the terms "user equipment" (or "UE"), "user device," "user terminal," "client device," "communication device," "wireless device," "wireless communications device," "handheld device," "mobile device," "mobile terminal," "mobile station," "handset," "access terminal," "subscriber device," "subscriber terminal," "subscriber station," "terminal," and variants thereof may interchangeably refer to any suitable mobile or stationary device that can receive wireless communication and/or navigation signals. These terms are also intended to include devices which communicate with another device that can receive wireless communication and/or navigation signals such as by short-range wireless, infrared, wireline connection, or other connection, regardless of whether satellite signal reception, assistance data reception, and/or position-related processing occurs at the device or at the other device. In addition, these terms are intended to include all devices, including wireless and wireline communication devices, that can communicate with a core network via a radio access network (RAN), and through the core network the UEs can be connected with external networks such as the Internet and with other UEs. Of course, other mechanisms of connecting to the core network and/or the Internet are also possible for the UEs, such as over a wired access network, a wireless local area network (WLAN) (e.g., based on IEEE 802.11, etc.) and so on. UEs can be embodied by any of a number of types of devices including but not limited to printed circuit (PC) cards, compact flash devices, external or internal modems, wireless or wireline phones, smartphones, tablets, tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

According to various aspects, FIG. 1 illustrates an exemplary wireless communications system 100. The wireless communications system 100 (which may also be referred to as a wireless wide area network (WWAN)) may include various base stations 102 and various UEs 104. The base stations 102 may include macro cells (high power cellular base stations) and/or small cells (low power cellular base stations), wherein the macro cells may include Evolved NodeBs (eNBs), where the wireless communications system 100 corresponds to an LTE network, or gNodeBs (gNBs), where the wireless communications system 100 corresponds to a 5G network or a combination of both, and the small cells may include femtocells, picocells, microcells, etc.

The base stations 102 may collectively form a Radio Access Network (RAN) and interface with an Evolved Packet Core (EPC) or Next Generation Core (NGC) through backhaul links. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/NGC) over backhaul links 134, which may be wired or wireless.

The base stations 102 may wirelessly communicate with the UEs 104. Each of the base stations 102 may provide communication coverage for a respective geographic coverage area 110. In an aspect, although not shown in FIG. 1, geographic coverage areas 110 may be subdivided into a plurality of cells (e.g., three), or sectors, each cell corresponding to a single antenna or array of antennas of a base station 102. As used herein, the term "cell" or "sector" may correspond to one of a plurality of cells of a base station 102, or to the base station 102 itself, depending on the context.

While neighboring macro cell geographic coverage areas 110 may partially overlap (e.g., in a handover region), some of the geographic coverage areas 110 may be substantially overlapped by a larger geographic coverage area 110. For example, a small cell base station 102' may have a geographic coverage area 110' that substantially overlaps with the geographic coverage area 110 of one or more macro cell base stations 102. A network that includes both small cell and macro cells may be known as a heterogeneous network.

A heterogeneous network may also include Home eNBs (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. Allocation of carriers may be asymmetric with respect to DL and UL (e.g., more or less carriers may be allocated for DL than for UL).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) prior to communicating in order to determine whether the channel is available.

The small cell base station 102' may operate in a licensed and/or an unlicensed frequency spectrum. When operating in an unlicensed frequency spectrum, the small cell base station 102' may employ LTE or 5G technology and use the same 5 GHz unlicensed frequency spectrum as used by the WLAN AP 150. The small cell base station 102', employing LTE/5G in an unlicensed frequency spectrum, may boost coverage to and/or increase capacity of the access network. LTE in an unlicensed spectrum may be referred to as LTE-unlicensed (LTE-U), licensed assisted access (LAA), or MulteFire.

The wireless communications system 100 may further include a mmW base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 may utilize beamforming 184 with the UE 182 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

The wireless communications system 100 may further include one or more UEs, such as UE 190, that connects indirectly to one or more communication networks via one or more device-to-device (D2D) peer-to-peer (P2P) links. In the embodiment of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192-194 may be supported with any well-known D2D radio access technology (RAT), such as LTE Direct (LTE-D), WiFi Direct (WiFi-D), Bluetooth, and so on.

Figure 2A:
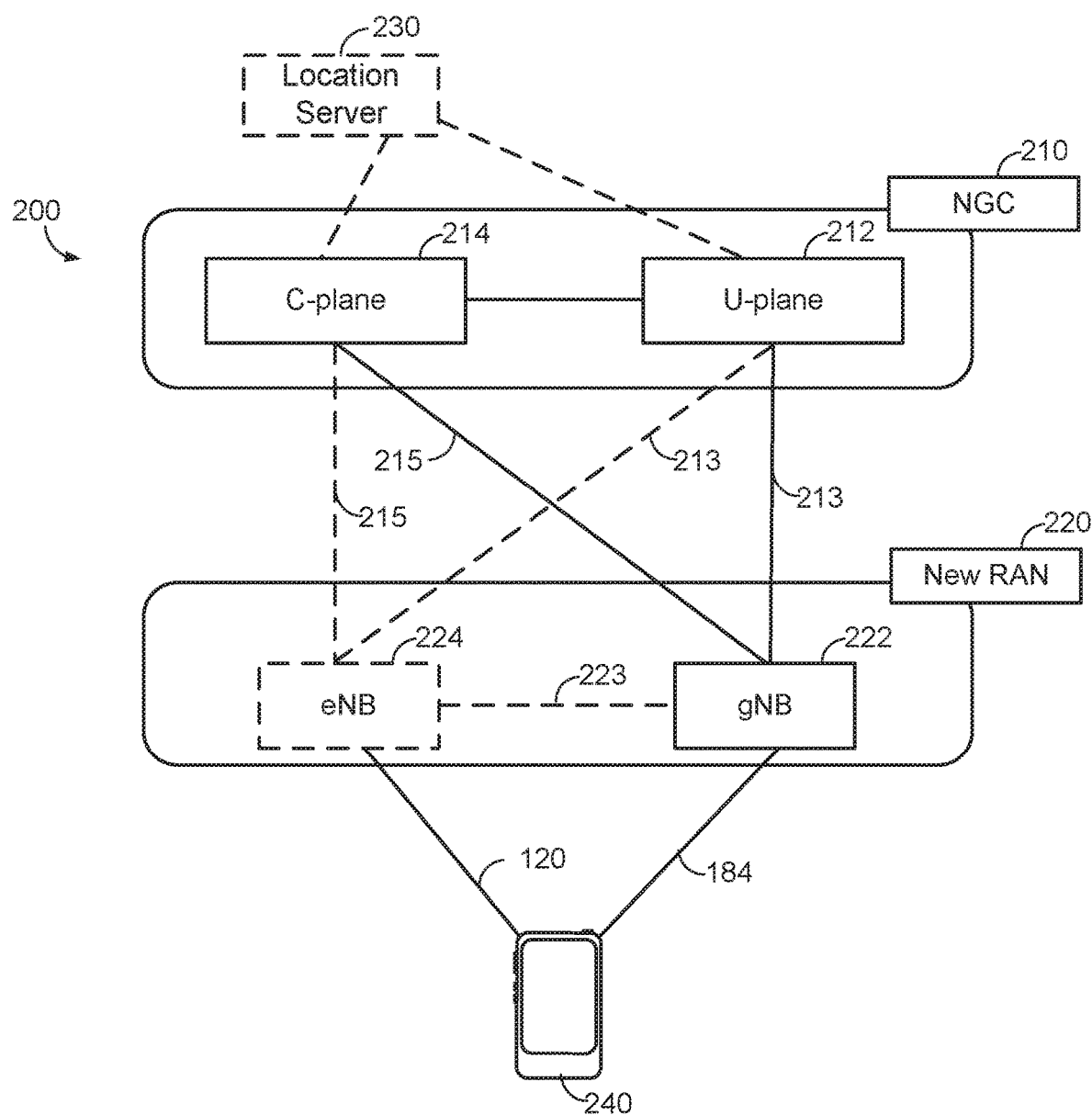
FIGS. 2A and 2B illustrate example wireless network structures, according to various aspects.

According to various aspects, FIG. 2A illustrates an example wireless network structure 200. For example, a Next Generation Core (NGC) 210 can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the NGC 210 and specifically to the control plane functions 214 and user plane functions 212. In an additional configuration, an eNB 224 may also be connected to the NGC 210 via NG-C 215 to the control plane functions 214 and NG-U 213 to user plane functions 212. Further, eNB 224 may directly communicate with gNB 222 via a backhaul connection 223. Accordingly, in some configurations, the New RAN 220 may only have one or more gNBs 222, while other configurations include one or more of both eNBs 224 and gNBs 222. Either gNB 222 or eNB 224 may communicate with UEs 240 (e.g., any of the UEs depicted in FIG. 1, such as UEs 104, UE 182, UE 190, etc.). Another optional aspect may include Location Server 230 which may be in communication with the NGC 210 to provide location assistance for UEs 240. The location server 230 can be implemented as a plurality of structurally separate servers, or alternately may each correspond to a single server. The location server 230 can be configured to support one or more location services for UEs 240 that can connect to the location server 230 via the core network, NGC 210, and/or via the Internet (not illustrated). Further, the location server 230 may be integrated into a component of the core network, or alternatively may be external to the core network.

Figure 2B:
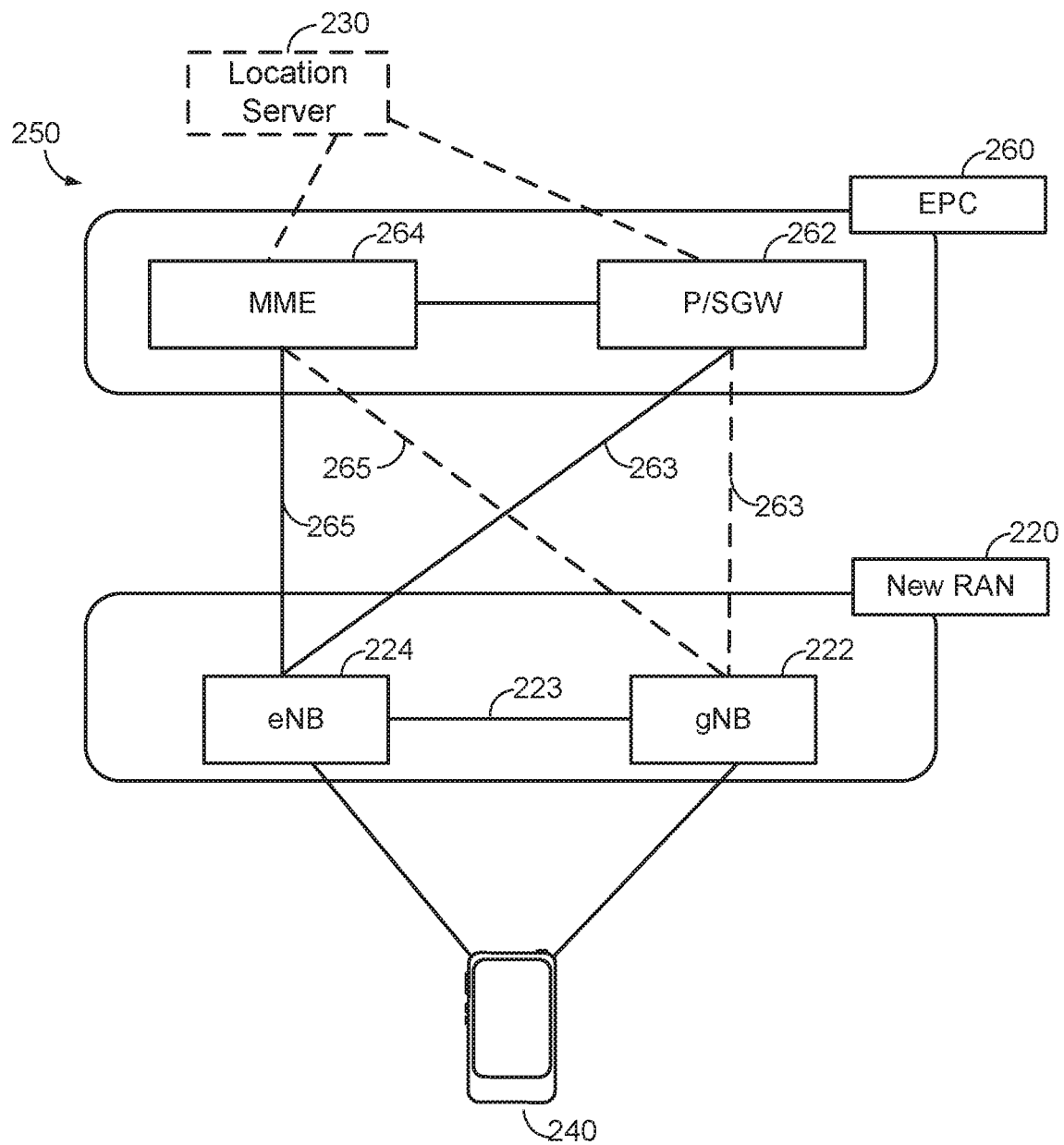

According to various aspects, FIG. 2B illustrates another example wireless network structure 250. For example, Evolved Packet Core (EPC) 260 can be viewed functionally as control plane functions, Mobility Management Entity (MME) 264 and user plane functions, Packet Data Network Gateway/Serving Gateway (P/SGW) 262, which operate cooperatively to form the core network. S1 user plane interface (S1-U) 263 and S1 control plane interface (S1-MME) 265 connect the eNB 224 to the EPC 260 and specifically to MME 264 and P/SGW 262. In an additional configuration, a gNB 222 may also be connected to the EPC 260 via S1-MME 265 to MME 264 and S1-U 263 to P/SGW 262. Further, eNB 224 may directly communicate to gNB 222 via the backhaul connection 223, with or without gNB direct connectivity to the EPC 260. Accordingly, in some configurations, the New RAN 220 may only have one or more gNBs 222, while other configurations include one or more of both eNBs 224 and gNBs 222. Either gNB 222 or eNB 224 may communicate with UEs 240 (e.g., any of the UEs depicted in FIG. 1, such as UEs 104, UE 182, UE 190, etc.). Another optional aspect may include Location Server 230 which may be in communication with the EPC 260 to provide location assistance for UEs 240. The location server 230 can be implemented as a plurality of structurally separate servers, or alternately may each correspond to a single server. The location server 230 can be configured to support one or more location services for UEs 240 that can connect to the location server 230 via the core network, EPC 260, and/or via the Internet (not illustrated).

Figure 3:
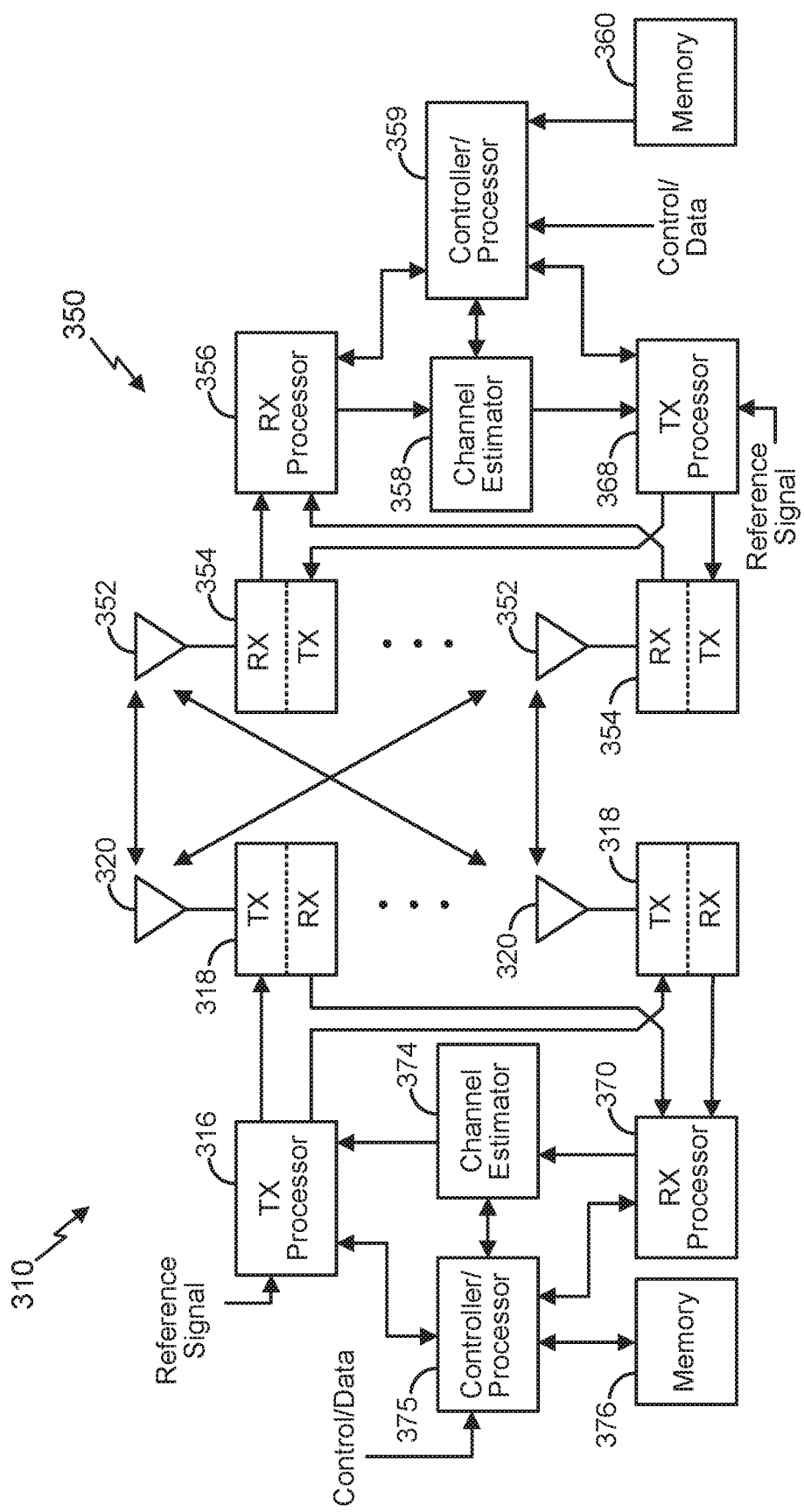
FIG. 3 illustrates an exemplary base station and an exemplary UE in an access network, according to various aspects.

According to various aspects, FIG. 3 illustrates an exemplary base station 310 (e.g., an eNB, a gNB, a small cell AP, a WLAN AP, etc.) in communication with an exemplary UE 350 in a wireless network. In the DL, IP packets from the core network (NGC 210/EPC 260) may be provided to a controller/processor 375. The controller/processor 375 implements functionality for a radio resource control (RRC) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmit (TX) processor 316 and the receive (RX) processor 370 implement Layer-1 functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to one or more different antennas 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the RX processor 356. The TX processor 368 and the RX processor 356 implement Layer-1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and de-interleaved to recover the data and control signals that were originally transmitted by the base station 310 on the physical channel. The data and control signals are then provided to the controller/processor 359, which implements Layer-3 and Layer-2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the core network. The controller/processor 359 is also responsible for error detection.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by the channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the core network. The controller/processor 375 is also responsible for error detection.

Figure 4:
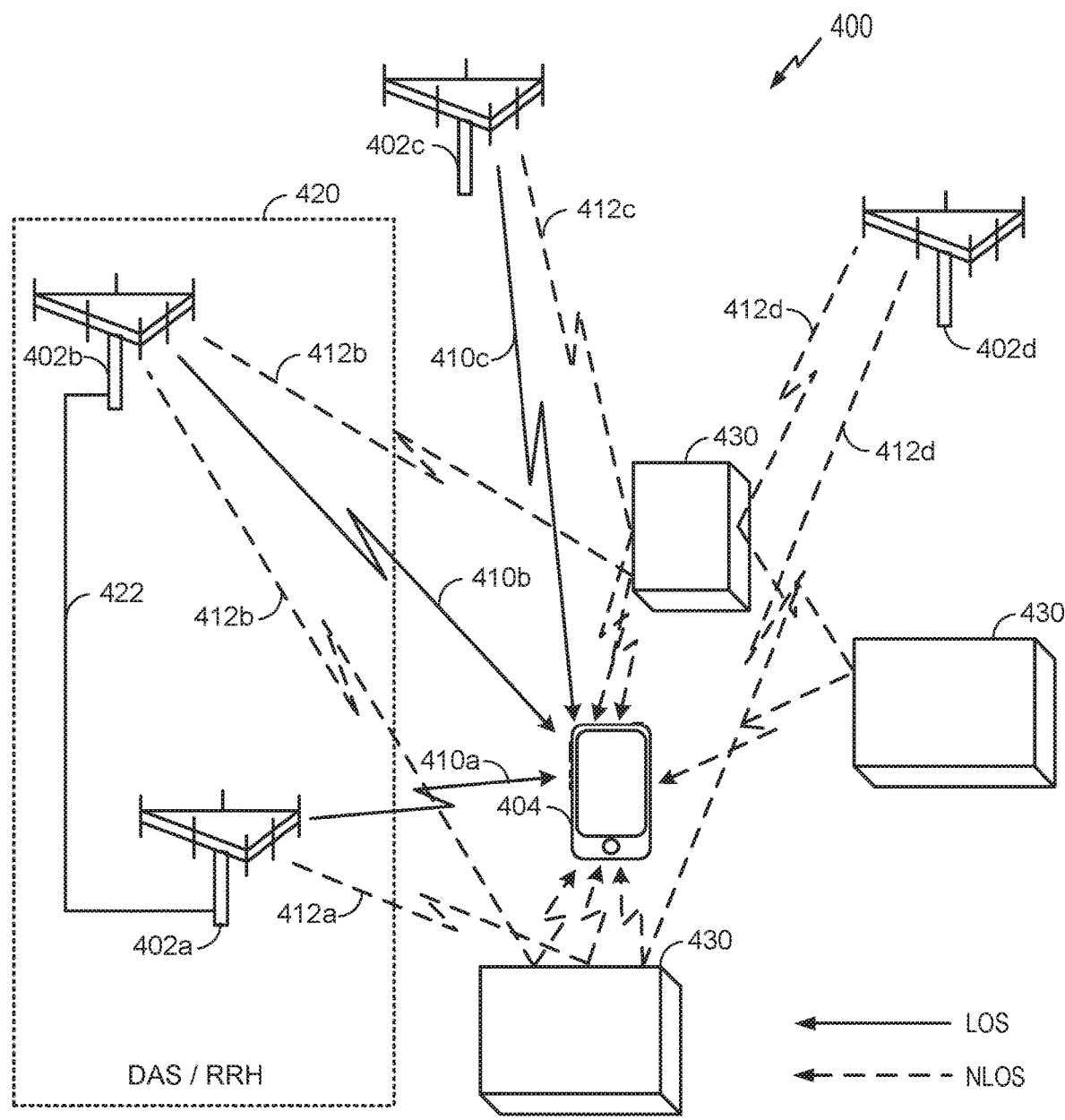
FIG. 4 illustrates an exemplary wireless communications system according to various aspects of the disclosure.

FIG. 4 illustrates an exemplary wireless communications system 400 according to various aspects of the disclosure. In the example of FIG. 4, a UE 404, which may correspond to any of the UEs described above with respect to FIG. 1 (e.g., UEs 104, UE 182, UE 190, etc.), is attempting to calculate an estimate of its position, or assist another entity (e.g., a base station or core network component, another UE, a location server, a third party application, etc.) to calculate an estimate of its position. The UE 404 may communicate wirelessly with a plurality of base stations 402*a*-*d* (collectively, base stations 402), which may correspond to any combination of base stations 102 or 180 and/or WLAN AP 150 in FIG. 1, using RF signals and standardized protocols for the modulation of the RF signals and the exchange of information packets. By extracting different types of information from the exchanged RF signals, and utilizing the layout of the wireless communications system 400 (i.e., the base stations locations, geometry, etc.), the UE 404 may determine its position, or assist in the determination of its position, in a predefined reference coordinate system. In an aspect, the UE 404 may specify its position using a two-dimensional coordinate system; however, the aspects disclosed herein are not so limited, and may also be applicable to determining positions using a three-dimensional coordinate system, if the extra dimension is desired. Additionally, while FIG. 4 illustrates one UE 404 and four base stations 402, as will be appreciated, there may be more UEs 404 and more or fewer base stations 402.

To support position estimates, the base stations 402 may be configured to broadcast reference RF signals (e.g., Positioning Reference Signals (PRS), Cell-specific Reference Signals (CRS), Channel State Information Reference Signals (CSI-RS), synchronization signals, etc.) to UEs 404 in their coverage area to enable a UE 404 to measure reference RF signal timing differences (e.g., OTDOA or RSTD) between pairs of network nodes and/or to identify the beam that best excite the LOS or shortest radio path between the UE 404 and the transmitting base stations 402. Identifying the LOS/shortest path beam(s) is of interest not only because these beams can subsequently be used for OTDOA measurements between a pair of base stations 402, but also because identifying these beams can directly provide some positioning information based on the beam direction. Moreover, these beams can subsequently be used for other position estimation methods that require precise ToA, such as round-trip time estimation based methods.

As used herein, a "network node" may be a base station 402, a cell of a base station 402, a remote radio head, an antenna of a base station 402, where the locations of the antennas of a base station 402 are distinct from the location of the base station 402 itself, or any other network entity capable of transmitting reference signals. Further, as used herein, a "node" may refer to either a network node or a UE.

A location server (e.g., location server 230) may send assistance data to the UE 404 that includes an identification of one or more neighbor cells of base stations 402 and configuration information for reference RF signals transmitted by each neighbor cell. Alternatively, the assistance data can originate directly from the base stations 402 themselves (e.g., in periodically broadcasted overhead messages, etc.). Alternatively, the UE 404 can detect neighbor cells of base stations 402 itself without the use of assistance data. The UE 404 (e.g., based in part on the assistance data, if provided) can measure and (optionally) report the OTDOA from individual network nodes and/or RSTDs between reference RF signals received from pairs of network nodes. Using these measurements and the known locations of the measured network nodes (i.e., the base station(s) 402 or antenna (s) that transmitted the reference RF signals that the UE 404 measured), the UE 404 or the location server can determine the distance between the UE 404 and the measured network nodes and thereby calculate the location of the UE 404.

The term "position estimate" is used herein to refer to an estimate of a position for a UE 404, which may be geographic (e.g., may comprise a latitude, longitude, and possibly altitude) or civic (e.g., may comprise a street address, building designation, or precise point or area within or nearby to a building or street address, such as a particular entrance to a building, a particular room or suite in a building, or a landmark such as a town square). A position estimate may also be referred to as a "location," a "position," a "fix," a "position fix," a "location fix," a "location estimate," a "fix estimate," or by some other term. The means of obtaining a location estimate may be referred to generically as "positioning," "locating," or "position fixing." A particular solution for obtaining a position estimate may be referred to as a "position solution." A particular method for obtaining a position estimate as part of a position solution may be referred to as a "position method" or as a "positioning method."

The term "base station" may refer to a single physical transmission point or to multiple physical transmission points that may or may not be co-located. For example, where the term "base station" refers to a single physical transmission point, the physical transmission point may be an antenna of the base station (e.g., base station 402) corresponding to a cell of the base station. Where the term "base station" refers to multiple co-located physical transmission points, the physical transmission points may be an array of antennas (e.g., as in a MIMO system or where the base station employs beamforming) of the base station. Where the term "base station" refers to multiple non-co-located physical transmission points, the physical transmission points may be a Distributed Antenna System (DAS) (a network of spatially separated antennas connected to a common source via a transport medium) or a Remote Radio Head (RRH) (a remote base station connected to a serving base station). Alternatively, the non-co-located physical transmission points may be the serving base station receiving the measurement report from the UE (e.g., UE 404) and a neighbor base station whose reference RF signals the UE is measuring. Thus, FIG. 4 illustrates an aspect in which base stations 402*a* and 402*b* form a DAS/RRH 420. For example, the base station 402*a* may be the serving base station of the UE 404 and the base station 402*b* may be a neighbor base station of the UE 404. As such, the base station 402*b* may be the RRH of the base station 402*a*. The base stations 402*a* and 402*b* may communicate with each other over a wired or wireless link 422.

To accurately determine the position of the UE 404 using the OTDOAs and/or RSTDs between RF signals received from pairs of network nodes, the UE 404 needs to measure the reference RF signals received over the LOS path (or the shortest NLOS path where an LOS path is not available), between the UE 404 and a network node (e.g., base station 402, antenna). However, RF signals travel not only by the LOS/shortest path between the transmitter and receiver, but also over a number of other paths as the RF signals spread out from the transmitter and reflect off other objects such as hills, buildings, water, and the like on their way to the receiver. Thus, FIG. 4 illustrates a number of LOS paths 410 and a number of NLOS paths 412 between the base stations 402 and the UE 404. Specifically, FIG. 4 illustrates base station 402*a* transmitting over an LOS path 410*a* and an NLOS path 412*a*, base station 402*b* transmitting over an LOS path 410*b* and two NLOS paths 412*b*, base station 402*c* transmitting over an LOS path 410*c* and an NLOS path 412c, and base station 402d transmitting over two NLOS paths 412d. As illustrated in FIG. 4, each NLOS path 412 reflects off some object 430 (e.g., a building). As will be appreciated, each LOS path 410 and NLOS path 412 transmitted by a base station 402 may be transmitted by different antennas of the base station 402 (e.g., as in a MIMO system), or may be transmitted by the same antenna of a base station 402 (thereby illustrating the propagation of an RF signal). Further, as used herein, the term "LOS path" refers to the shortest path between a transmitter and receiver, and may not be an actual LOS path, but rather, the shortest NLOS path.

In an aspect, one or more of base stations 402 may be configured to use beamforming to transmit RF signals. In that case, some of the available beams may focus the transmitted RF signal along the LOS paths 410 (e.g., the beams produce highest antenna gain along the LOS paths) while other available beams may focus the transmitted RF signal along the NLOS paths 412. A beam that has high gain along a certain path and thus focuses the RF signal along that path may still have some RF signal propagating along other paths; the strength of that RF signal naturally depends on the beam gain along those other paths. An "RF signal" comprises an electromagnetic wave that transports information through the space between the transmitter and the receiver. As used herein, a transmitter may transmit a single "RF signal" or multiple "RF signals" to a receiver. However, as described further below, the receiver may receive multiple "RF signals" corresponding to each transmitted RF signal due to the propagation characteristics of RF signals through multipath channels.

Where a base station 402 uses beamforming to transmit RF signals, the beams of interest for data communication between the base station 402 and the UE 404 will be the beams carrying RF signals that arrive at UE 404 with the highest signal strength (as indicated by, e.g., the Received Signal Received Power (RSRP) or SINR in the presence of a directional interfering signal), whereas the beams of interest for position estimation will be the beams carrying RF signals that excite the shortest path or LOS path (e.g., an LOS path 410). In some frequency bands and for antenna systems typically used, these will be the same beams. However, in other frequency bands, such as mmW, where typically a large number of antenna elements can be used to create narrow transmit beams, they may not be the same beams. As described below with reference to FIG. 5, in some cases, the signal strength of RF signals on the LOS path 410 may be weaker (e.g., due to obstructions) than the signal strength of RF signals on an NLOS path 412, over which the RF signals arrive later due to propagation delay.

Figure 5:
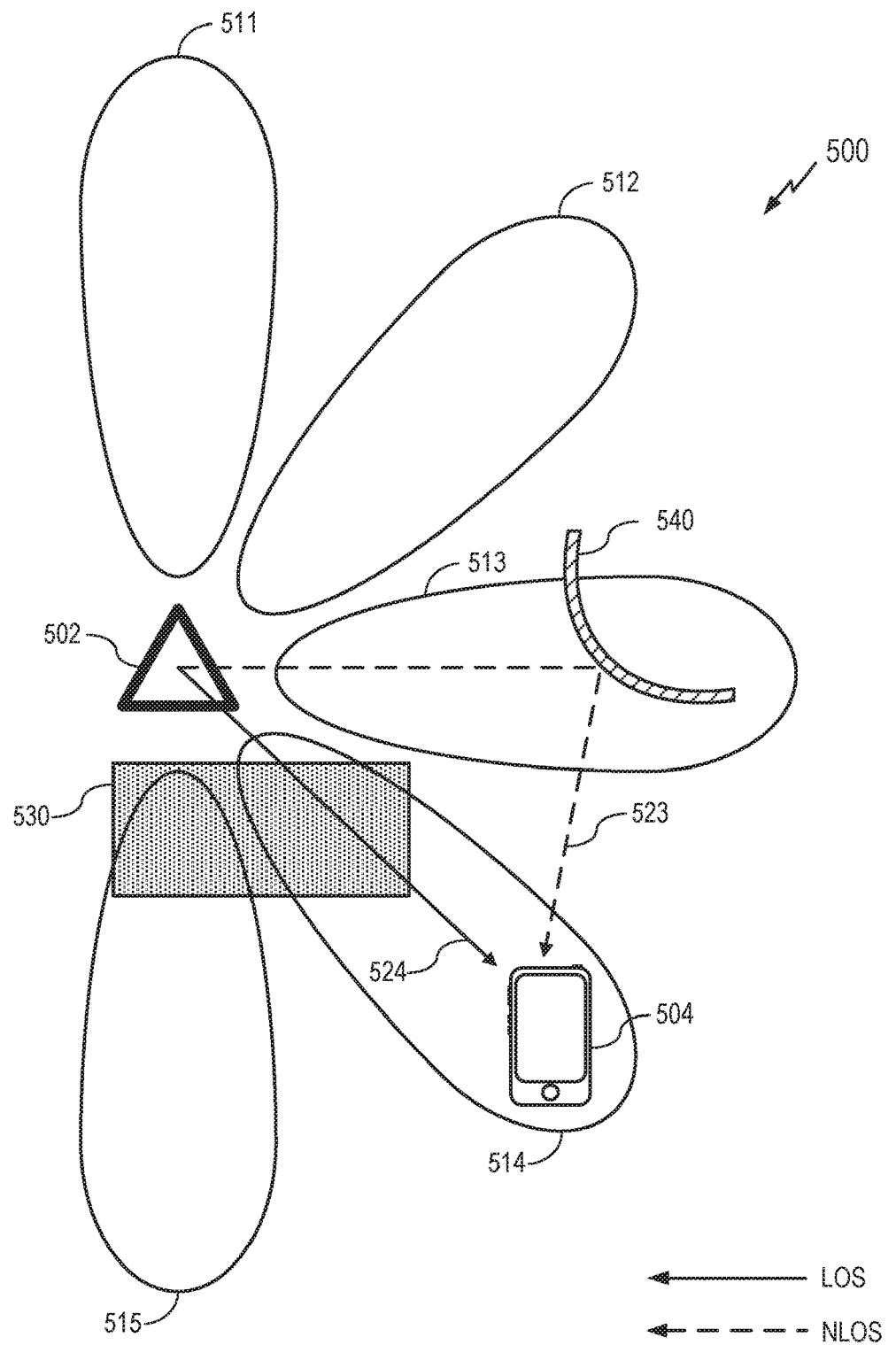
FIG. 5 illustrates an exemplary wireless communications system according to various aspects of the disclosure.

FIG. 5 illustrates an exemplary wireless communications system 500 according to various aspects of the disclosure. In the example of FIG. 5, a UE 504, which may correspond to UE 404 in FIG. 4, is attempting to calculate an estimate of its position, or to assist another entity (e.g., a base station or core network component, another UE, a location server, a third party application, etc.) to calculate an estimate of its position. The UE 504 may communicate wirelessly with a base station 502, which may correspond to one of base stations 402 in FIG. 4, using RF signals and standardized protocols for the modulation of the RF signals and the exchange of information packets.

As illustrated in FIG. 5, the base station 502 is utilizing beamforming to transmit a plurality of beams 511-515 of RF signals. Each beam 511-515 may be formed and transmitted by an array of antennas of the base station 502. Although FIG. 5 illustrates a base station 502 transmitting five beams, as will be appreciated, there may be more or fewer than five beams, beam shapes such as peak gain, width, and side-lobe gains may differ amongst the transmitted beams, and some of the beams may be transmitted by a different base station.

A beam index may be assigned to each of the plurality of beams 511-515 for purposes of distinguishing RF signals associated with one beam from RF signals associated with another beam. Moreover, the RF signals associated with a particular beam of the plurality of beams 511-515 may carry a beam index indicator. A beam index may also be derived from the time of transmission, e.g., frame, slot and/or OFDM symbol number, of the RF signal. The beam index indicator may be, for example, a three-bit field for uniquely distinguishing up to eight beams. If two different RF signals having different beam indices are received, this would indicate that the RF signals were transmitted using different beams. If two different RF signals share a common beam index, this would indicate that the different RF signals are transmitted using the same beam. Another way to describe that two RF signals are transmitted using the same beam is to say that the antenna port(s) used for the transmission of the first RF signal are spatially quasi-collocated with the antenna port(s) used for the transmission of the second RF signal.

In the example of FIG. 5, the UE 504 receives an NLOS data stream 523 of RF signals transmitted on beam 513 and an LOS data stream 524 of RF signals transmitted on beam 514. Although FIG. 5 illustrates the NLOS data stream 523 and the LOS data stream 524 as single lines (dashed and solid, respectively), as will be appreciated, the NLOS data stream 523 and the LOS data stream 524 may each comprise multiple rays (i.e., a "cluster") by the time they reach the UE 504 due, for example, to the propagation characteristics of RF signals through multipath channels. For example, a cluster of RF signals is formed when an electromagnetic wave is reflected off of multiple surfaces of an object, and reflections arrive at the receiver (e.g., UE 504) from roughly the same angle, each travelling a few wavelengths (e.g., centimeters) more or less than others. A "cluster" of received RF signals generally corresponds to a single transmitted RF signal.

In the example of FIG. 5, the NLOS data stream 523 is not originally directed at the UE 504, although, as will be appreciated, it could be, as are the RF signals on the NLOS paths 412 in FIG. 4. However, it is reflected off a reflector 540 (e.g., a building) and reaches the UE 504 without obstruction, and therefore, may still be a relatively strong RF signal. In contrast, the LOS data stream 524 is directed at the UE 504 but passes through an obstruction 530 (e.g., vegetation, a building, a hill, a disruptive environment such as clouds or smoke, etc.), which may significantly degrade the RF signal. As will be appreciated, although the LOS data stream 524 is weaker than the NLOS data stream 523, the LOS data stream 524 will arrive at the UE 504 before the NLOS data stream 523 because it follows a shorter path from the base station 502 to the UE 504.

As noted above, the beam of interest for data communication between a base station (e.g., base station 502) and a UE (e.g., UE 504) is the beam carrying RF signals that arrives at the UE with the highest signal strength (e.g., highest RSRP or SINR), whereas the beam of interest for position estimation is the beam carrying RF signals that excite the LOS path and that has the highest gain along the LOS path amongst all other beams (e.g., beam 514). That is, even if beam 513 (the NLOS beam) were to weakly excite the LOS path (due to the propagation characteristics of RF signals, even though not being focused along the LOS path), that weak signal, if any, of the LOS path of beam 513 may not be as reliably detectable (compared to that from beam 514), thus leading to greater error in performing a positioning measurement.

While the beam of interest for data communication and the beam of interest for position estimation may be the same beams for some frequency bands, for other frequency bands, such as mmW, they may not be the same beams. As such, referring to FIG. 5, where the UE 504 is engaged in a data communication session with the base station 502 (e.g., where the base station 502 is the serving base station for the UE 504) and not simply attempting to measure reference RF signals transmitted by the base station 502, the beam of interest for the data communication session may be the beam 513, as it is carrying the unobstructed NLOS data stream 523. The beam of interest for position estimation, however, would be the beam 514, as it carries the strongest LOS data stream 524, despite being obstructed.

Figure 6A:
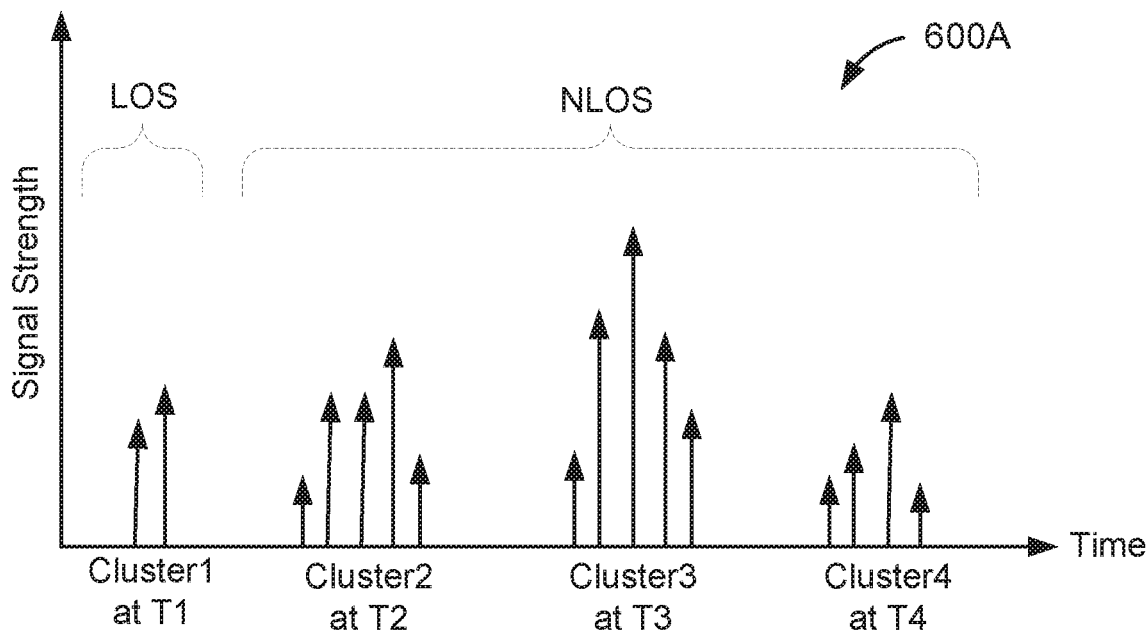
FIG. 6A is a graph showing the RF channel response at a UE over time according to aspects of the disclosure.
Figure 6B:
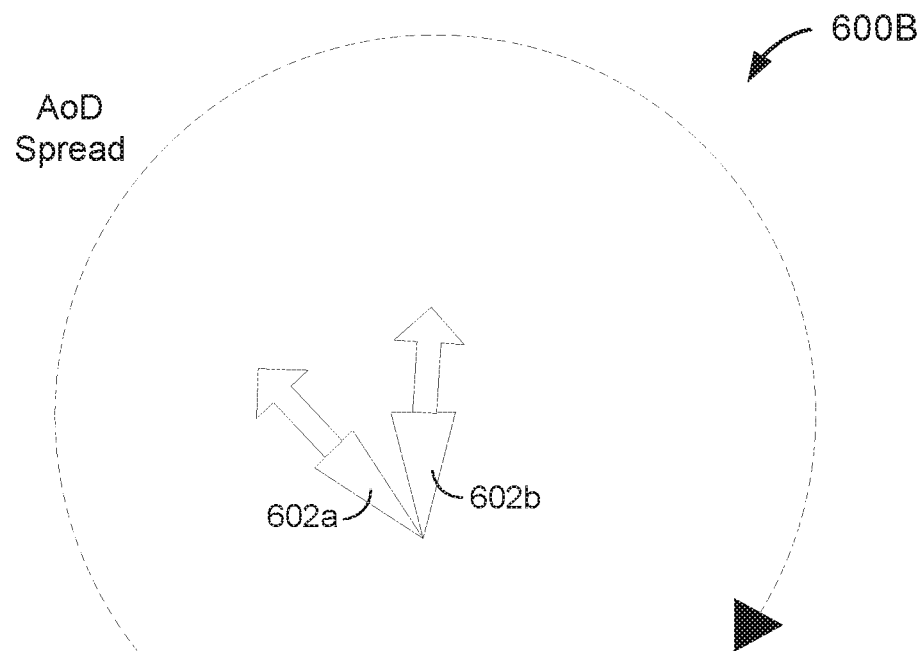
FIG. 6B illustrates an exemplary separation of clusters in Angle of Departure (AoD) according to aspects of the disclosure.

FIG. 6A is a graph 600A showing the RF channel response at a receiver (e.g., UE 504) over time according to aspects of the disclosure. Under the channel illustrated in FIG. 6A, the receiver receives a first cluster of two RF signals on channel taps at time T1, a second cluster of five RF signals on channel taps at time T2, a third cluster of five RF signals on channel taps at time T3, and a fourth cluster of four RF signals on channel taps at time T4. In the example of FIG. 6A, because the first cluster of RF signals at time T1 arrives first, it is presumed to be the LOS data stream (i.e., the data stream arriving over the LOS or the shortest path), and may correspond to the LOS data stream 524. The third cluster at time T3 is comprised of the strongest RF signals, and may correspond to the NLOS data stream 523. Seen from the transmitter's side, each cluster of received RF signals may comprise the portion of an RF signal transmitted at a different angle, and thus each cluster may be said to have a different angle of departure (AoD) from the transmitter. FIG. 6B is a diagram 600B illustrating this separation of clusters in AoD. The RF signal transmitted in AoD range 602a may correspond to one cluster (e.g., "Cluster1") in FIG. 6A, and the RF signal transmitted in AoD range 602b may correspond to a different cluster (e.g., "Cluster3") in FIG. 6A. Note that although AoD ranges of the two clusters depicted in FIG. 6B are spatially isolated, AoD ranges of some clusters may also partially overlap even though the clusters are separated in time. For example, this may arise when two separate buildings at same AoD from the transmitter reflect the signal towards the receiver. Note that although FIG. 6A illustrates clusters of two to five channel taps, as will be appreciated, the clusters may have more or fewer than the illustrated number of channel taps.

As in the example of FIG. 5, the base station may utilize beamforming to transmit a plurality of beams of RF signals such that one of the beams (e.g., beam 514) is directed at the AoD range 602a of the first cluster of RF signals, and a different beam (e.g., beam 513) is directed at the AoD range 602b of the third cluster of RF signals. The signal strength of clusters in post-beamforming channel response (i.e., the channel response when the transmitted RF signal is beamformed instead of omni-directional) will be scaled by the beam gain along the AoD of the clusters. In that case, the beam of interest for positioning would be the beam directed at the AoD of the first cluster of RF signals, as they arrive first, and the beam of interest for data communications may be the beam directed at the AoD of the third cluster of RF signals, as they are the strongest.

In general, when transmitting an RF signal, the transmitter does not know what path it will follow to the receiver (e.g., UE 504) or at what time it will arrive at the receiver, and therefore transmits the RF signal on different antenna ports with an equal amount of energy. Alternatively, the transmitter may beamform the RF signal in different directions over multiple transmission occasions and obtain measurement feedback from the receiver to explicitly or implicitly determine radio paths.

Note that although the techniques disclosed herein have generally been described in terms of transmissions from a base station to a UE, as will be appreciated, they are equally applicable to transmissions from a UE to a base station where the UE is capable of MIMO operation and/or beamforming. Also, while beamforming is generally described above in context with transmit beamforming, receive beamforming may also be used in conjunction with the above-noted transmit beamforming in certain embodiments.

As discussed above, in some frequency bands, the shortest path (which may, as noted above, be a LOS path or the shortest NLOS path) may be weaker than an alternative longer (NLOS) path (over which the RF signal arrives later due to propagation delay). Thus, where a transmitter uses beamforming to transmit RF signals, the beam of interest for data communication—the beam carrying the strongest RF signals—may be different from the beam of interest for position estimation—the beam carrying the RF signals that excite the shortest detectable path. As such, it would be beneficial for the receiver to identify and report the beam of interest for position estimation to the transmitter to enable the transmitter to subsequently modify the set of transmitted beams to assist the receiver to perform a position estimation.

Figure 7:
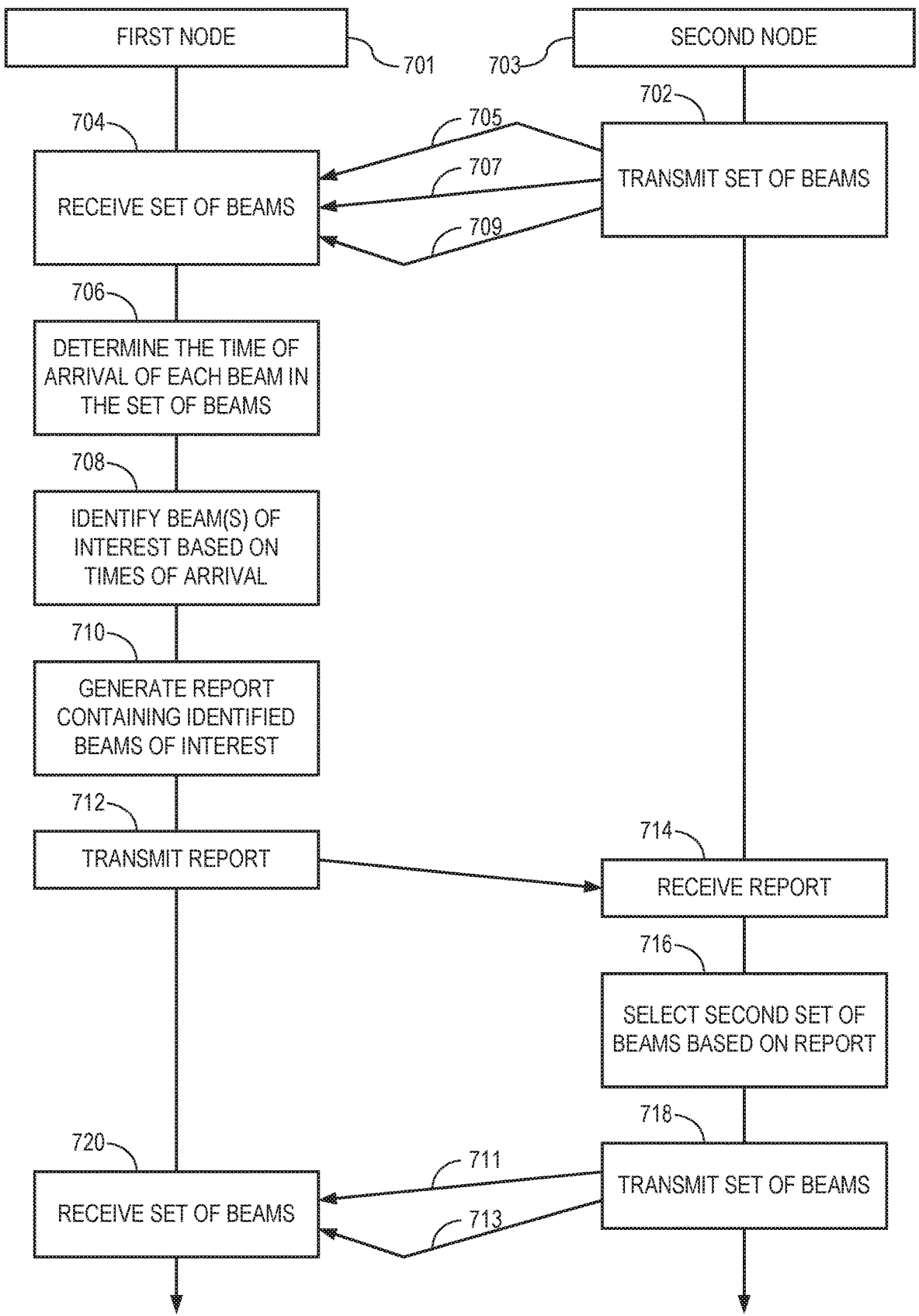
FIGS. 7-11 illustrate exemplary methods, according to various aspects.

FIG. 7 illustrates an exemplary method according to an aspect of the disclosure. At 702, a second node 703 (referred to as the "transmitter") transmits a set of beams 705, 707, and 709 to a first node 701 (referred to as the "receiver"). In an aspect, the first node 701 may be a UE, such as UE 350/404/504, and the second node 703 may be a base station, such as base station 310/402/502. However, in an aspect, the first node 701 may be a base station and the second node 703 may be a UE, or both the first node 701 and the second node 703 may be UEs or base stations. As yet another alternative, the second node 703 may be a single antenna or antenna array of a base station or UE capable of beamforming.

In the example of FIG. 7, the second node 703 transmits a set of three beams 705, 707, and 709. These beams may be transmitted simultaneously but distinguishable in frequency and/or code domain. Alternatively, these beams may be transmitted sequentially. The second node 703 may transmit the beams 705, 707, and 709 at different AoDs, as illustrated above in FIGS. 5 and 6B. In the example of FIG. 7, the beam 707 (illustrated as a straight line) may follow the shortest path (e.g., LOS path or shortest NLOS path when the LOS path is undetectable due to obstruction) from the second node 703 to the first node 701, and the beams 705 and 709 may follow longer (e.g., NLOS) paths from the second node 703 to the first node 701. As will be appreciated, there may be more or fewer than three beams, as shown above in the examples of FIGS. 4 and 5. In an aspect, the beams 705, 707, and 709 may carry synchronization signals, such as Synchronization Signal (SS) or PBCH blocks, CSI reference signals, positioning reference signals, cell reference signals, sounding reference signals, random access preamble, or the like.

At 704, the first node 701 receives the beams 705, 707, and 709. At 706, the first node 701 determines the time of arrival of each beam 705, 707, and 709. In an aspect, the first node 701 may determine the time of arrival of a beam as the time at which the first node 701 detects the first (or earliest)

channel tap of the radio channel between the nodes, where the channel is estimated from the received RF signal of a beam 705, 707, or 709. For example, the first node 701 may correlate the received signal of a beam with the (conjugate of) known transmitted RF signals and determine the channel taps from the peaks of correlation. The first node 701 may further estimate noise and eliminate channel taps that are less reliable for being comparable to a noise floor. The first node 701 may further employ techniques to eliminate spurious side peaks around strong channel taps, where the spurious side peaks are well known to arise from bandlimited reception at the first node 701. For simplicity, the first channel tap of an RF signal of a beam may also be referred to as the first channel tap of a beam.

At 708, the first node 701 identifies one or more beams of interest from the set of beams 705, 707, and 709 based on the times of arrival determined at 706. As noted above, in some frequency bands where typically deployed antenna systems do not create narrow enough beams, the beam(s) of interest would be the beam(s) 705, 707, and/or 709 carrying RF signals with the highest received signal strength at the first node 701 (e.g., RSRP or SINR), as these would also be the beam(s) following the shortest path to the first node 701. However, as discussed above, in some frequency bands, such as mmW, the beam carrying RF signals with the highest received signal strength may not be the best beam for positioning operations as it may not follow the shortest detectable path to the first node 701. As such, rather than select the beam(s) carrying RF signals with the highest received signal strength, the first node 701 instead identifies one or more of the earliest arriving beams of the beams 705, 707, and 709 as the one or more beams of interest. For example, the one or more beams of interest may be the beam 705, 707, or 709 with the first detected channel tap. Or the one or more beams of interest may be the N (greater than 1, e.g., 2) beams with the earliest detected channel taps. Or the one or more beams of interest may be the beam, or N beams, whose first detected channel tap is within a predetermined delay (e.g., 10 nanoseconds) from the first detected tap of the beam with the earliest detected first tap. At the speed of light of about 0.3 meters per nanosecond (ns), an error or ambiguity of 10 ns in time of arrival corresponds to a positioning/distancing error of approximately three meters. Therefore, the delay may be determined by the desired accuracy or achievable accuracy in the presence of other limiting factors, such as signal pulse width (related to signal bandwidth). The delay parameter may be provided to the second node 703 by the first node 701, or determined by the first node 701 itself and reported to the second node 703. In an aspect, where the first node 701 is a UE, the second node 703 (a base station) may command the first node 701 to report the beams of interest for position estimation (instead of the beams with the highest received signal strength, as is conventionally done), the number N of beams to report, and/or the "delay" parameter for selecting N beams.

At 710, the first node 701 generates a report containing identifiers (e.g., beam indices) of the one or more beams of interest identified at 708. At 712, the first node 701 transmits the report to the second node 703.

At 714, the second node 703 receives the report. The first node 701 may transmit at 712, and the second node 703 may receive at 714, the report over a wireless interface, such as a communication link 120 in FIG. 1. The reception point of the second node 703 that receives the report may or may not be collocated with the transmission point(s) of second node 703 from which the beams 705, 707, 709 are transmitted. For example, the reception point of the second node that receives the report may be assigned a different cell identity than that of the transmission point of the node that transmits the beams. The reception point may be the serving cell and the transmission point may be a non-serving cell, such as a neighbor cell.

At 716, the second node 703 can select a second set of beams for transmission based on the received report. For example, where the first node 701 is attempting to perform a position estimation and the identified beam(s) are cell synchronization beam(s), the second node 703 can update the beam(s) identified in the report to transmit positioning RF signals, such as PRS or CSI-RS. Generally, beams transmitting synchronization signals are broader (less focused) than beams transmitting reference RF signals (e.g., CSI-RS). As such, in an aspect, the second node 703 may also transmit one or more finer (more focused) beams around the beam(s) identified in the report, after they have been modified to transmit reference RF signals. More specifically, the second node 703 may narrow the focus of the identified beam(s) and transmit one or more additional narrowly focused beams in the direction of the identified beam(s).

As another example, again where the first node 701 is attempting to perform a position estimation and the identified beam(s) are cell synchronization beam(s), the second node 703 can transmit one or more beams carrying positioning RF signals in the direction of the beam(s) identified in the report, without modifying the beam(s) identified in the report. Thus, in an aspect, the transmission of beams 705, 707, and 709 at 702 may be periodic (e.g., a broadcast for the benefit of all UEs served by the second node, where the second node is a base station), and the selection of beams at 716 may be for the transmission of specific positioning beacons for the benefit of the first node only, and may be transmitted at a different periodicity or aperiodically.

In an aspect, where the first node 701 is a base station, then reporting the beam indices at 710 and 712 means that the first node 701 asks the second node 703 (the UE) to transmit further reference beams based on the report. For example, the request may be to transmit the reported beams again, or to transmit finer beams around the reported beams. Thus, the operation at 708 is a way to shortlist the beam(s) of interest and subsequently to use the shortlisted beam(s) for on-going position estimation while discarding the 'uninteresting' beams.

At 718, the second node 703 transmits the second set of beams, here, beams 711 and 713. As discussed above, the beams 711 and 713 may correspond to two of the beams 705, 707, and 709 (where the report received at 714 identifies two of beams 705, 707, and 709), but modified to transmit reference RF signals (e.g., PRS, CRS). Alternatively, beams 711 and 713 may correspond to one of beams 705, 707, and 709 modified to transmit reference RF signals, and an additional beam transmitting reference RF signals in the direction of the beams identified in the report received at 714. In yet another aspect, beams 711 and 713 may be two new beams transmitting reference RF signals in the direction of the beams identified in the report received at 714. In an aspect, although not illustrated, prior to transmitting the beams 711 and 713, the second node 703 may transmit an indication of which beams it has selected for transmission at 718.

In the example of FIG. 7, there are two beams (711 and 713) transmitted at 718. However, as will be appreciated, this is merely an example, and there may be more or fewer beams transmitted at 718. In addition, in FIG. 7, beam 711 is illustrated as following a LOS path and beam 713 is illustrated as following an NLOS path (i.e., as reflected off an object). However, as will be appreciated, both beams 711 and 713 may follow a LOS path, or both may be reflected.

At 720, the first node 701 receives the beams 711 and 713. The first node 701 may perform the process of FIG. 7 with a plurality of second nodes, including the second node 703, in order to receive a sufficient number of shortest path beams that can be accurately measured to calculate, or assist the calculation of, a position estimate. For example, to perform a single OTDOA measurement, the first node 701 needs to measure reference RF signals from at least two second nodes. The first node 701 may make multiple OTDOA measurements to improve accuracy of a position estimate of the first node 701.

Figure 8:
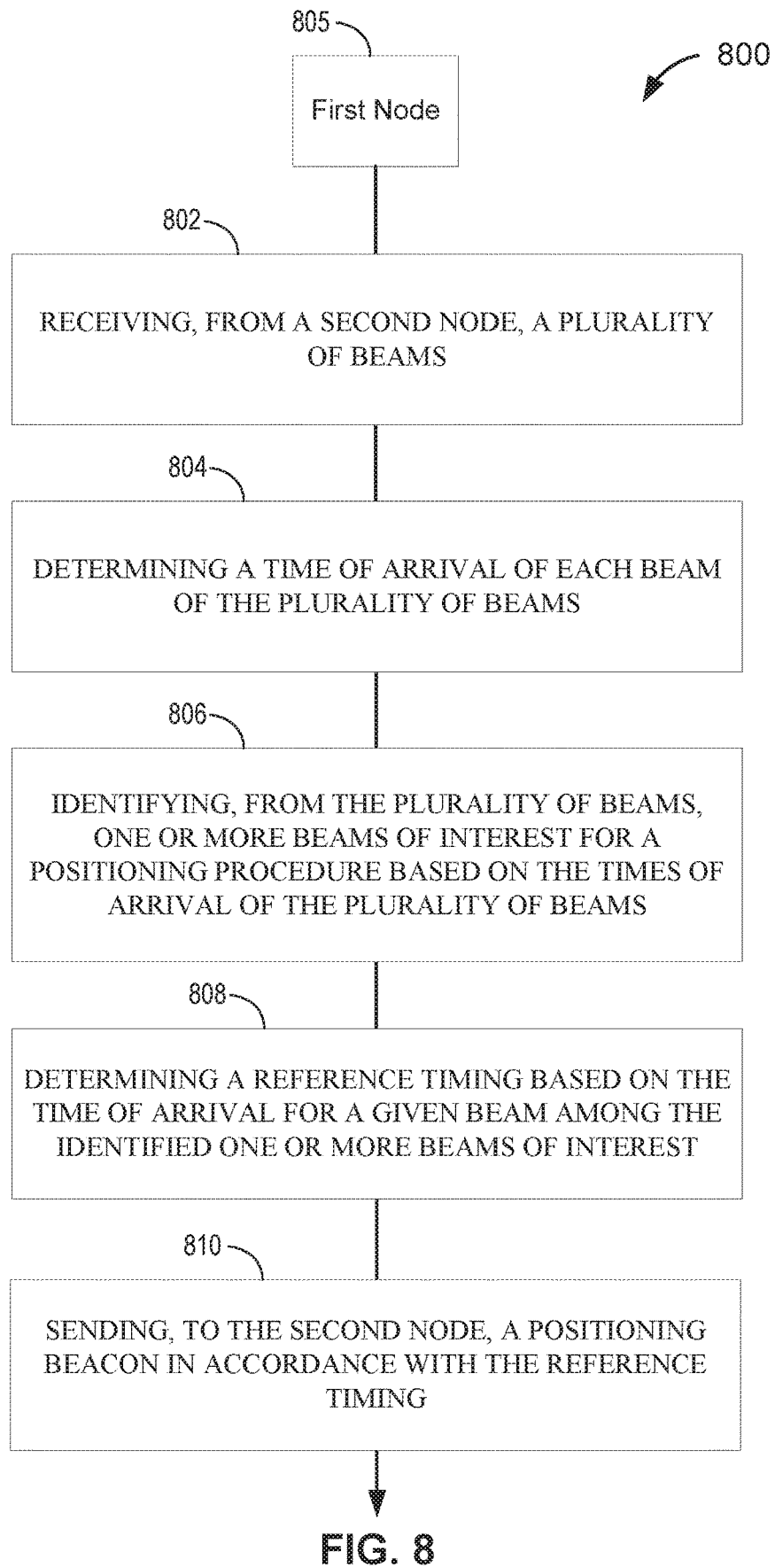

FIG. 8 illustrates an exemplary method 800 for determining a reference timing for transmission of a positioning beacon in accordance with an embodiment of the disclosure. The method 800 may be performed by a first node 805, such as the base station 310 or UE 350 or the first node 701 in FIG. 7. Moreover, the process of FIG. 8 may be performed between a UE (e.g., the UE 350) and multiple base stations as part of a UE positioning procedure.

Referring to FIG. 8, at 802, the first node 805 (e.g., antenna(s) 320, receiver(s) 318, and/or RX processor 370, or antenna(s) 352, receiver(s) 354, and/or RX processor 356) receives, from a second node (e.g., the base station 310 or UE 350 or the second node 703 in FIG. 7) a plurality of beams (e.g., beams 511-515). At 804, the first node 805 (e.g., RX processor 370 and/or controller/processor 375, or RX processor 356 and/or controller/processor 359) determines a time of arrival of each beam of the plurality of beams. At 806, the first node 805 (e.g., RX processor 370 and/or controller/processor 375, or RX processor 356 and/or controller/processor 359) identifies, from the plurality of beams, one or more beams of interest for determining a positioning procedure based on the times of arrival of the plurality of beams.

In a further example, in addition to the times of arrival of the plurality of beams, the first node 805 may also factor one or more secondary criteria at 804 and/or 806. For example, the one or more secondary criteria may be factored at 804 so that time(s) of arrival for one or more beams which do not satisfy the one or more secondary criteria are not computed by the first node 805. Alternatively, the one or more secondary criteria may be factored at 806 so any time(s) of arrival for beams which do not satisfy the one or more secondary criteria are excluded from selection as the identified beam(s) of interest by the first node 805. In either case, in one or more embodiments, beams which do not satisfy the one or more secondary criteria do not become part of the identified one or more beams at 806.

In one example of the one or more secondary criteria, the identified one or more beams of interest may be required to satisfy at least one quality threshold (e.g., RSRP being higher than a minimum threshold, or at least one channel tap having a minimum received signals strength or a minimum signal-to-noise ratio). In an example, the at least one quality threshold may be configured by a network component such as a base station (e.g., which may correspond to either the first node 805 or the second node depending on the implementation). In this way, the network component may improve reliability of beam-specific ToA detection, and may prevent a poorly implemented first node detector (e.g., a UE detector, if the first node 805 is a UE) from confusing a random noise spike as an earliest channel tap for a particular beam. In a further example, if no channel tap of any detected reference beam satisfies the quality threshold, the first node 805 may ignore the quality threshold and be free to select the beam with the earliest ToA, irrespective of the quality (e.g., received signal strength, signal-to-noise ratio, etc.) of the detected signal for that beam.

Referring to FIG. 8, at 808, the first node 805 (e.g., RX processor 370 and/or controller/processor 375, or RX processor 356 and/or controller/processor 359) determines a reference timing based on the time of arrival for a given beam among the identified one or more beams of interest. At 810, the first node 805 (e.g., TX processor 316 and/or controller/processor 375, or TX processor 368 and/or controller/processor 359) sends, to the second node, a positioning beacon in accordance with the reference timing. While not shown expressly in FIG. 8, the positioning beacon transmitted at 810 in FIG. 8 may be used at the second node to compute a timing metric (e.g., a round-trip time or RTT).

Referring to FIG. 8, in an embodiment, the reference timing is the time of transmission of the positioning beacon. The time of arrival (ToA), or time of reception, of this positioning beacon at the second node is then used by second node to estimate Round-Trip Time (RTT). That RTT is subsequently used to estimate distance between the nodes and ultimately the position of the first node.

More specifically, in an example, the reference timing may be based upon information received at the first node from the second node (e.g., before the process of FIG. 8 is executed) that is indicative of a timing of offset for the reference timing. For example, the timing offset may be exactly N OFDM symbol durations from the ToA of the given beam at 808. The value of N may further depend on the index of the given beam, in which case, the mapping between the beam index and the value N is provided in the information received at the first node from the second node. The ToA of the given beam is thereby an anchor point from which the reference timing is determined. As noted above, this anchor point does not necessarily correspond to the beam having the strongest channel tap, although this is possible. The reference timing, which may be indicated via knowledge of the number 'N' along with knowledge of the length of each OFDM symbol duration, may be known at both the first and second nodes. For example, the number of OFDM durations (i.e., N) from which the positioning beacon is offset from a designated beam (i.e., the given beam) may be explicitly designated by the second node to the first node, or alternatively may be implicitly derived at the first node based on a configuration (e.g., a RACH configuration) sent by the second node to the first node.

Various example implementations of the process of FIG. 8 are described below with respect to FIGS. 9-10.

Figure 9:
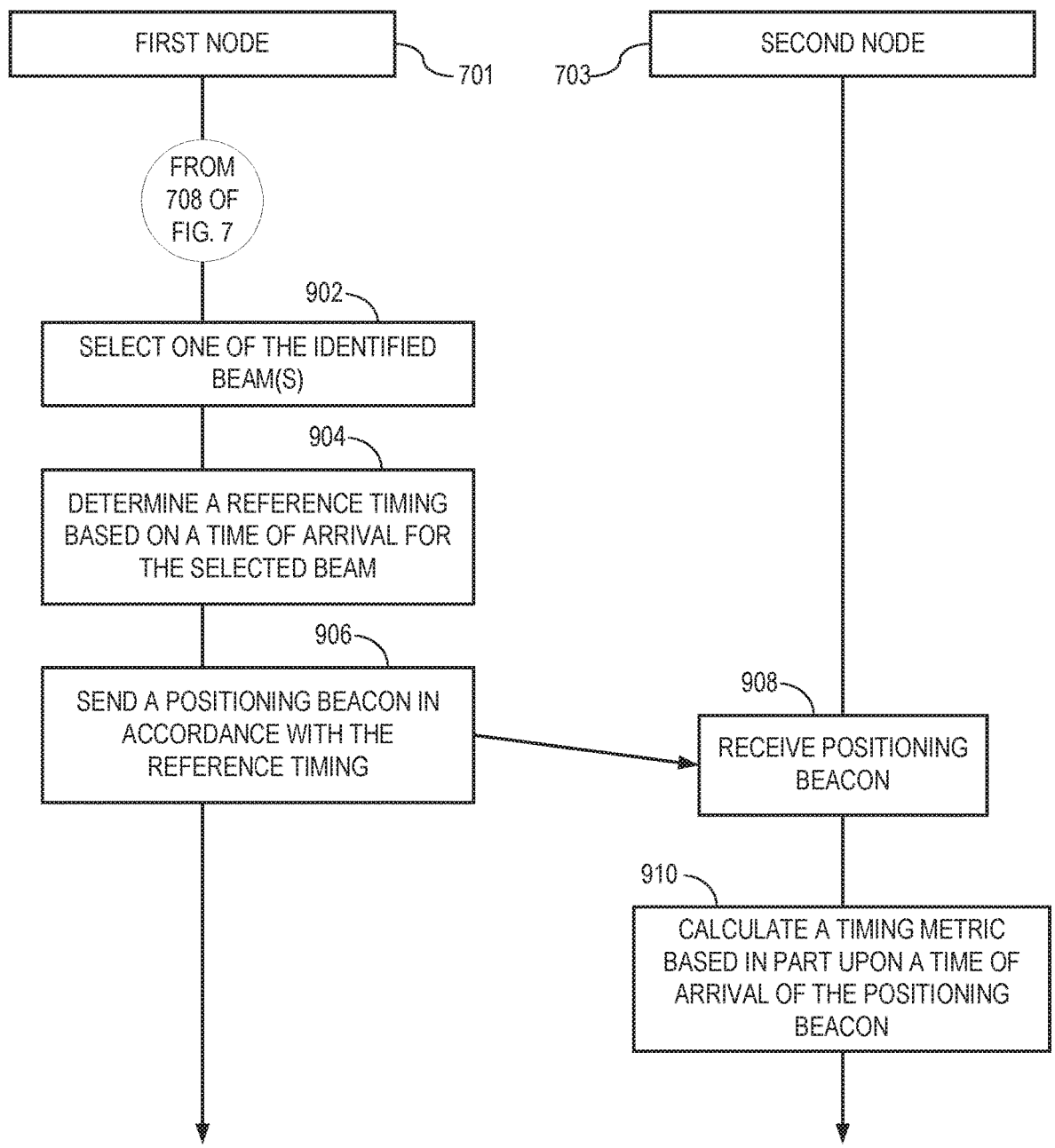

Referring to FIG. 9, assume that 702-708 of FIG. 7 are performed, with 802-806 of FIG. 8 corresponding to 704-708 of FIG. 7, respectively. After 708 of FIG. 7, at 902, the first node 701 selects one of the identified beam(s), and at 904, the first node 701 determines a reference timing based on a time of arrival for the selected beam (e.g., as in 808 of FIG. 8). At 906, the first node 701 sends a positioning beacon in accordance with the reference timing from 904 (e.g., as in 810 of FIG. 8). Once again, in an embodiment, the reference timing may correspond to a time of transmission of the positioning beacon that is offset from the time of arrival of the selected beam by a given amount (e.g., N OFDM symbol durations, whereby N is explicitly or implicitly conveyed by the second node to the first node prior to the process of FIGS. 7 and 9). At 908, the second node 703 receives the positioning beacon. At 910, the second node 703 calculates a timing metric (e.g., RTT) based in part upon a time of arrival of the positioning beacon. While not shown in FIG. 9, timing metrics (e.g., RTTs) between a UE and multiple base stations may be computed and shared with an entity (e.g., a location server with knowledge of the locations of the base stations), which may then use the timing metrics to estimate a position of the UE using multilateration (e.g., trilateration).

Figure 10:
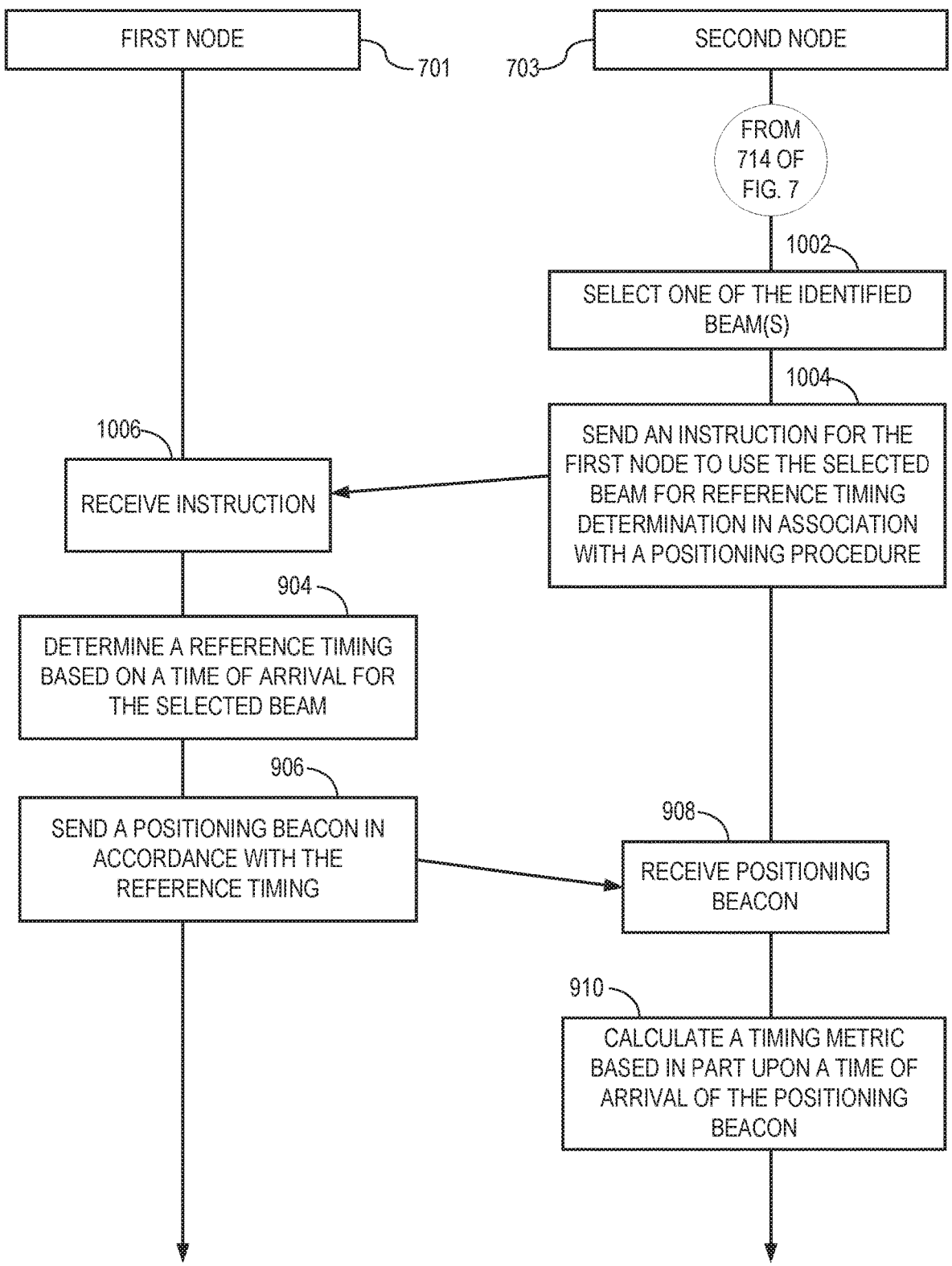

Referring to FIG. 10, assume that 702-714 of FIG. 7 are performed, with 802-806 of FIG. 8 corresponding to 704-708 of FIG. 7, respectively. After the beam report is received at the second node 703 at 714 of FIG. 7, at 1002, the second node 703 selects one of the identified beam(s), and at 1004, the second node 703 sends an instruction for the first node 701 to use the selected beam for reference timing determination in association with a positioning procedure. At 1006, the first node 701 receives the instruction from the second node 703. After 1006, 904-910 of FIG. 9 are performed as described above. So, FIG. 9 represents an example whereby the first node 701 selects the beam for which the reference timing is computed, whereas FIG. 10 represents an example whereby the second node 703 selects the beam for which the reference timing is computed.

It will be appreciated that the position determination processes of FIGS. 7 and 9-10 may occur in parallel with data communication processes between the first and second nodes, as discussed below with respect to FIG. 11. The process of FIG. 11 may be performed during a start or resumption (e.g., to recover from beam failure, etc.) of a data connection (e.g., when the UE performs a random access procedure on a random access channel (RACH) with a base station).

Figure 11:
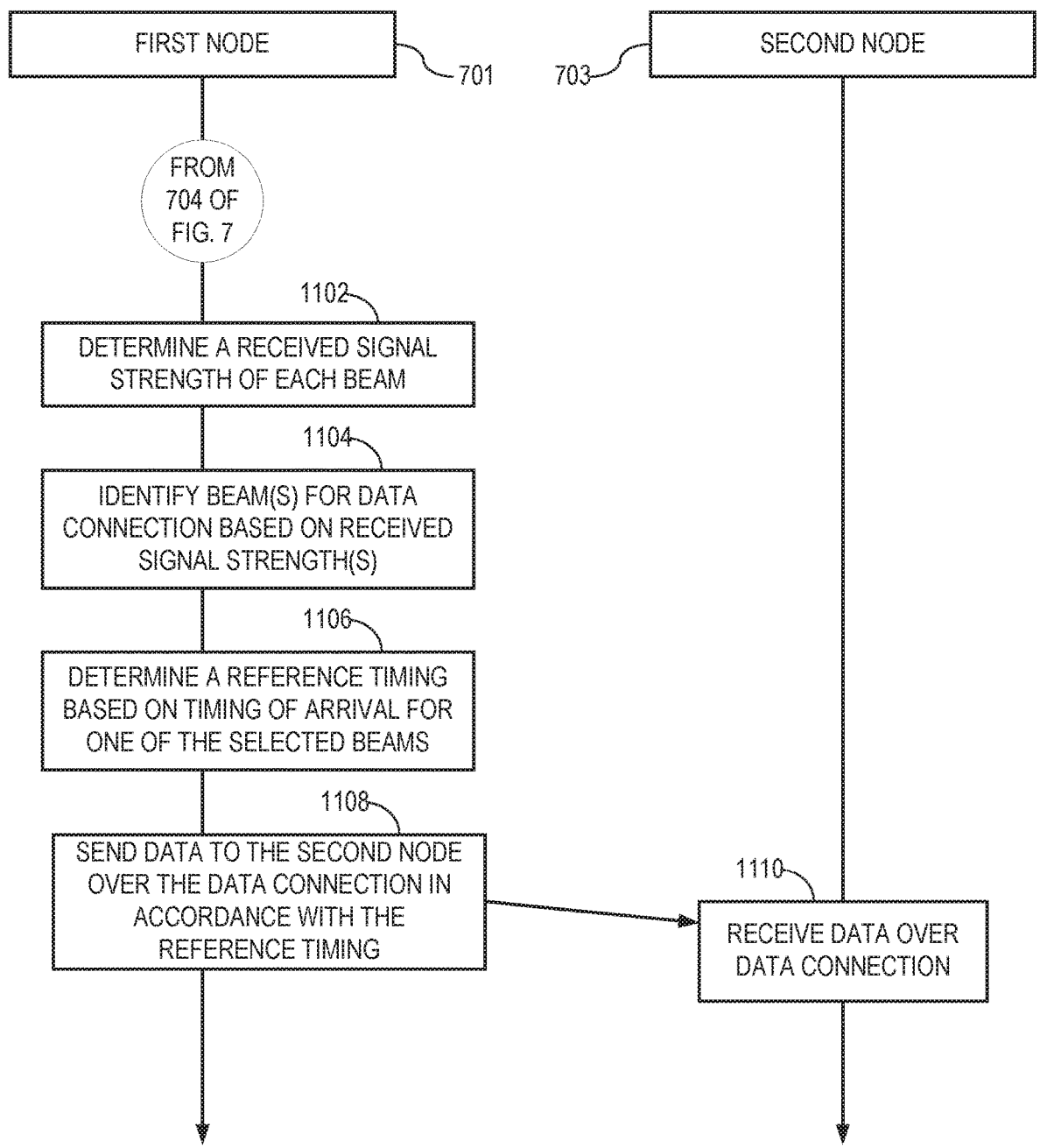

Referring to FIG. 11, assume that 702-704 of FIG. 7 are performed, after which the process of any of FIGS. 7 and/or 9-10 may be performed. At 1102, in addition to determining the times of arrivals of each beam (e.g., as at 706 of FIG. 7), the first node 701 also determines a received signal strength (e.g., RSRP) of each beam at 1102. At 1104, the first node 701 identifies one or more beams to be used in association with a data connection between the first node 701 and the second node 703 based on the determined received signal strengths from 1102. The beam(s) identified to support the data connection at 1104 may be different from the beam(s) identified at 708 of FIG. 7 to support a positioning procedure. At 1106, the first node 701 determines a reference timing based on one or more times of arrivals for the identified beam(s) from 1104. For example, to determine the reference timing at 1106, the time of arrival for the strongest channel tap among the identified beam(s) from 1104 can be used, or a function of the times of arrivals for multiple channel taps may be used. Similar to the reference timing for the positioning beacon, the reference timing for the data connection may correspond to a time of transmission of respective data that is offset from the time of arrival of the selected beam by a given amount (e.g., N OFDM symbol durations, whereby N is explicitly or implicitly conveyed by the second node to the first node prior to the process of FIGS. 7 and 11). In contrast to the reference timing for the positioning beacon, the reference timing for the data connection may correspond to a time of transmission of respective data that is offset from the strongest estimated channel tap (instead of the ToA) of the selected beam by a given amount (e.g., N OFDM symbol durations, whereby N is explicitly or implicitly conveyed by the second node to the first node prior to the process of FIGS. 7 and 11). In an example, if any estimated RTT from a data transmission is subsequently not used for position estimation, the latter approach—i.e., using the strongest estimated channel tap—may be more advantageous, and the formal approach may be unnecessary.

Referring to 1106 of FIG. 11, in addition to the received signal strengths measured at the first node 701 at 1102, the reference timing may also be computed based on information provided from the second node 703. For example, the first node 701 (e.g., a UE) may transmit a RACH preamble transmission which is received by the second node 703 (e.g., a base station). The second node 703 may then compute a timing adjustment (e.g., a timing advance), and sends this timing adjustment to the first node 701. The first node 701 may then use the timing adjustment as part of the computation to the determine the reference timing at 1106, i.e., in conjunction with the time(s) of arrival of the identified beam(s). At 1108, the first node 701 sends data to the second node 703 over the data connection in accordance with the reference timing, which is received at the second node 703 at 1110.

Referring to FIG. 11, it will be appreciated that the identified beam(s) and/or the reference timing used for the data connection may be different than the identified beam(s) and/or the reference timing used for positioning in any of FIGS. 7-10. Also, while FIG. 11 is described as a parallel process to the processes of FIGS. 7-10, the process of FIG. 11 may also be implemented as a completely separate process (e.g., using different beams from beams 705-709 which are not used as part of a positioning procedure). Generally, the process of FIG. 11 shows that the criteria (e.g., highest received signal strength or shortest path) by which beam(s) are selected or identified may depend upon the function (e.g., a positioning procedure or data transfer) .to be implemented on the respective beam(s).

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the various aspects described herein.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or other such configurations).

The methods, sequences, and/or algorithms described in connection with the aspects disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of non-transitory computer-readable medium known in the art. An exemplary non-transitory computer-readable medium may be coupled to the processor such that the processor can read information from, and write information to, the non-transitory computer-readable medium. In the alternative, the non-transitory computer-readable medium may be integral to the processor. The processor and the non-transitory computer-readable medium may reside in an ASIC. The ASIC may reside in a user device (e.g., a UE) or a base station. In the alternative, the processor and the non-transitory computer-readable medium may be discrete components in a user device or base station.

In one or more exemplary aspects, the functions described herein may be implemented in hardware, software, firmware, or any combination thereof. If implemented in software, the functions may be stored on or transmitted over as one or more instructions or code on a non-transitory computer-readable medium. Computer-readable media may include storage media and/or communication media including any non-transitory medium that may facilitate transferring a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of a medium. The term disk and disc, which may be used interchangeably herein, includes CD, laser disc, optical disc, DVD, floppy disk, and Blu-ray discs, which usually reproduce data magnetically and/or optically with lasers. Combinations of the above should also be included within the scope of computer-readable media.

While the foregoing disclosure shows illustrative aspects, those skilled in the art will appreciate that various changes and modifications could be made herein without departing from the scope of the disclosure as defined by the appended claims. Furthermore, in accordance with the various illustrative aspects described herein, those skilled in the art will appreciate that the functions, steps, and/or actions in any methods described above and/or recited in any method claims appended hereto need not be performed in any particular order. Further still, to the extent that any elements are described above or recited in the appended claims in a singular form, those skilled in the art will appreciate that singular form(s) contemplate the plural as well unless limitation to the singular form(s) is explicitly stated.

What is claimed is:

1. A method of operating a first node, comprising:
    receiving, at the first node from a second node, a plurality of beams;
    determining, by the first node, a time of arrival of each beam of the plurality of beams;
    identifying, by the first node from the plurality of beams, one or more first beams of interest for a positioning procedure based on the times of arrival of the plurality of beams;
    determining a first reference timing based on the time of arrival for a given beam among the identified one or more first beams of interest; and
    sending, by the first node to the second node, a positioning beacon in accordance with the first reference timing.

2. The method of claim 1, wherein the positioning beacon is transmitted to facilitate calculation of a timing metric at the second node.

3. The method of claim 2, wherein the timing metric is a round trip time (RTT) between the first and second nodes.

4. The method of claim 1, further comprising:
    determining, by the first node, a received signal strength of each beam of the plurality of beams or a different plurality of beams;
    identifying, by the first node from the plurality of beams or the different plurality of beams, one or more second beams to be used in association with a data connection between the first and second nodes based on the determined received signal strengths;
    determining a second reference timing based on one or more times of arrival for the identified one or more second beams; and
    sending, by the first node to the second node, data over the data connection in accordance with the second reference timing.

5. The method of claim 1, wherein the identified one or more first beams of interest correspond to the beam or beams among the plurality of beams with an earliest time or times of arrival.

6. The method of claim 1, wherein the given beam is the beam associated with an earliest time of arrival among the plurality of beams.

7. The method of claim 6,
    wherein each of the plurality of beams is associated with a set of channel taps detected at the first node, and
    wherein the given beam corresponds to the beam among the plurality of beams with an earliest channel tap among its respective set of channel taps.

8. The method of claim 1, further comprising:
    sending, by the first node to the second node, a report indicating each of the identified one or more first beams of interest; and
    receiving, at the first node from the second node in response to the report, an instruction to use the given beam to determine the first reference timing.

9. The method of claim 1, wherein the given beam is received over a shortest path from the first node to the second node.

10. The method of claim 9,
    wherein the shortest path corresponds to a non-Line of Sight (NLOS) path.

11. The method of claim 1, wherein at least one of the plurality of beams other than the given beam has a higher received signal strength at the first node relative to a received signal strength of the given beam.

12. The method of claim 1, wherein each of the plurality of beams arrive at the first node at a different Angle of Arrival (AoA).

13. The method of claim 1, wherein the first node receives the plurality of beams on an extremely high frequency (EHF) band.

14. The method of claim 13, wherein the EHF band comprises a millimeter wave (mmW) frequency band.

15. The method of claim 1, wherein each of the plurality of beams carries synchronization signals for the second node.

16. The method of claim 1, wherein the first node is a user equipment and the second node is a base station or an antenna or an antenna array of the base station.

17. The method of claim 1, wherein the first node is a base station or an antenna or an antenna array of the base station and the second node is a user equipment.

18. The method of claim 1, further comprising:
receiving, from the second node, information indicative of a timing offset for the first reference timing,
wherein the first reference timing corresponds to a time at which the first node transmits the positioning beacon, and
wherein the first reference timing is offset from the time of arrival for the given beam by the timing offset.

19. The method of claim 18,
wherein the received information indicates the timing offset via an express indication of a number of OFDM symbol durations, or
wherein the received information indicates the timing offset implicitly via an indication of a configuration from which the first node derives the timing offset.

20. A first node, comprising:
means for receiving, from a second node, a plurality of beams;
means for determining a time of arrival of each beam of the plurality of beams;
means for identifying, from the plurality of beams, one or more first beams of interest for a positioning procedure based on the times of arrival of the plurality of beams;
means for determining a first reference timing based on the time of arrival for a given beam among the identified one or more first beams of interest; and
means for sending, to the second node, a positioning beacon in accordance with the first reference timing.

21. The first node of claim 20, wherein the identified one or more first beams of interest correspond to the beam or beams among the plurality of beams with an earliest time or times of arrival.

22. The first node of claim 20, wherein the given beam is the beam associated with an earliest time of arrival among the plurality of beams.

23. The first node of claim 20, wherein the given beam is received over a shortest path from the first node to the second node.

24. A first node, comprising:
a memory; and
at least one processor coupled to the memory and a communications interface, the at least one processor configured to:
receive, from a second node, a plurality of beams;
determine a time of arrival of each beam of the plurality of beams;
identify, from the plurality of beams, one or more first beams of interest for a positioning procedure based on the times of arrival of the plurality of beams;
determine a first reference timing based on the time of arrival for a given beam among the identified one or more first beams of interest; and
send, to the second node, a positioning beacon in accordance with the first reference timing.

25. The first node of claim 24, wherein the identified one or more first beams of interest correspond to the beam or beams among the plurality of beams with an earliest time or times of arrival.

26. The first node of claim 24, wherein the given beam is the beam associated with an earliest time of arrival among the plurality of beams.

27. The first node of claim 24, wherein the given beam is received over a shortest path from the first node to the second node.

28. A non-transitory computer-readable medium containing instructions stored thereon, which, when executed by a first node, cause the first node to perform operations, the instructions comprising:
at least one instruction configured to cause the first node to receive, from a second node, a plurality of beams;
at least one instruction configured to cause the first node to determine a time of arrival of each beam of the plurality of beams;
at least one instruction configured to cause the first node to identify, from the plurality of beams, one or more first beams of interest for a positioning procedure based on the times of arrival of the plurality of beams;
at least one instruction configured to cause the first node to determine a first reference timing based on the time of arrival for a given beam among the identified one or more first beams of interest; and
at least one instruction configured to cause the first node to send, to the second node, a positioning beacon in accordance with the first reference timing.

29. The first node of claim 28,
wherein the identified one or more first beams of interest correspond to the beam or beams among the plurality of beams with an earliest time or times of arrival, and/or
wherein the given beam is the beam associated with an earliest time of arrival among the plurality of beams.

30. The first node of claim 28, wherein the given beam is received over a shortest path from the first node to the second node.

* * * * *